(12) United States Patent
Wang et al.

(10) Patent No.: US 12,739,784 B2
(45) Date of Patent: Sep. 15, 2026

(54) WIRELESS TRACKING

(71) Applicant: Origin Research Wireless, Inc., Rockville, MD (US)

(72) Inventors: Wei-Hsiang Wang, Winterville, NC (US); Yuqian Hu, Sunnyvale, CA (US); Beibei Wang, McLean, VA (US); Guozhen Zhu, Rockville, MD (US); K. J. Ray Liu, Potomac, MD (US)

(73) Assignee: ORIGIN RESEARCH WIRELESS, INC., Rockville, MD (US)

( * ) Notice: Subject to any disclaimer, the term of this patent is extended or adjusted under 35 U.S.C. 154(b) by 0 days.

(21) Appl. No.: 19/390,548

(22) Filed: Nov. 15, 2025

(65) Prior Publication Data

US 2026/0075580 A1 Mar. 12, 2026

Related U.S. Application Data

(63) Continuation-in-part of application No. 19/260,558, filed on Jul. 6, 2025, and a continuation-in-part of application No. 19/004,301, filed on Dec. 28, 2024, and a continuation-in-part of application No. 18/991,634, filed on Dec. 22, 2024, and a continuation-in-part of application No. 18/991,632, filed on Dec. 22, 2024, now Pat. No. 12,493,666, and a continuation-in-part of application No. 18/991,629, filed on Dec. 22, 2024, and a continuation-in-part of (Continued)

(51) Int. Cl.

| | |
|---|---|
| ***H04W 4/021*** | (2018.01) |
| ***H04W 4/029*** | (2018.01) |
| ***H04W 64/00*** | (2009.01) |

(52) U.S. Cl.

CPC ................................ *H04W 64/006* (2013.01)

(58) Field of Classification Search

CPC .... H04W 64/006; H04W 4/021; H04W 4/029

See application file for complete search history.

(56) References Cited

U.S. PATENT DOCUMENTS

2019/0349715 A1* 11/2019 Ghourchian ............ H04W 4/33
2020/0163590 A1* 5/2020 Lin ...................... A61B 5/1117

* cited by examiner

*Primary Examiner* — Christopher M Brandt
(74) *Attorney, Agent, or Firm* — Slater Matsil, LLP

(57) ABSTRACT

Examples for performing wireless tracking are described. In one example, a described method comprises: transmitting, by at least one transmitter, a wireless signal through a wireless channel of a venue; receiving, by a receiver, the wireless signal, wherein the received wireless signal differs from the transmitted wireless signal due to the wireless channel and a motion of an object in the venue, wherein neither the at least one transmitter nor the receiver moves with the object; obtaining a time series of channel information (TSCI) of the wireless channel in a time window based on the received wireless signal; generating a plurality of features based on the TSCI over the time window; obtaining a signature map of the venue, wherein each location on the signature map is assigned one or more location signatures representing unique features associated with the location when there is any object at the location; identifying, for each time stamp in the time window, an estimated location of the object in the venue based on the signature map and the plurality of features, and generating a trajectory of the object in the venue over the time window based on the estimated locations of the object.

20 Claims, 11 Drawing Sheets

Related U.S. Application Data application No. 18/391,529, filed on Dec. 20, 2023, and a continuation-in-part of application No. 18/108,563, filed on Feb. 10, 2023, and a continuation-in-part of application No. 17/838,231, filed on Jun. 12, 2022, and a continuation-in-part of application No. 17/838,228, filed on Jun. 12, 2022, and a continuation-in-part of application No. 17/540,156, filed on Dec. 1, 2021, and a continuation-in-part of application No. 17/149,625, filed on Jan. 14, 2021.

(60) Provisional application No. 63/902,471, filed on Oct. 20, 2025, provisional application No. 63/799,327, filed on May 2, 2025, provisional application No. 63/721,406, filed on Nov. 15, 2024.

200

400

620

610

WIRELESS TRACKING

CROSS-REFERENCE TO RELATED APPLICATIONS

The present application hereby incorporates by reference the entirety of the disclosures of, and claims priority to, each of the following cases:

(a) U.S. patent application Ser. No. 17/149,625, entitled "METHOD, APPARATUS, AND SYSTEM FOR WIRELESS MONITORING WITH MOTION LOCALIZATION", filed on Jan. 14, 2021;
(b) U.S. patent application Ser. No. 17/540,156, entitled "METHOD, APPARATUS, AND SYSTEM FOR POSITIONING AND POWERING A WIRELESS MONITORING SYSTEM", filed on Dec. 1, 2021;
(c) U.S. patent application Ser. No. 17/838,228, entitled "METHOD, APPARATUS, AND SYSTEM FOR WIRELESS SENSING BASED ON CHANNEL INFORMATION", filed on Jun. 12, 2022;
(d) U.S. patent application Ser. No. 17/838,231, entitled "METHOD, APPARATUS, AND SYSTEM FOR IDENTIFYING AND QUALIFYING DEVICES FOR WIRELESS SENSING", filed on Jun. 12, 2022;
(e) U.S. patent application Ser. No. 18/108,563, entitled "METHOD, APPARATUS, AND SYSTEM FOR WIRELESS SENSING BASED ON MULTIPLE GROUPS OF WIRELESS DEVICES", filed on Feb. 10, 2023;
(f) U.S. patent application Ser. No. 18/391,529, entitled "METHOD, APPARATUS, AND SYSTEM FOR WIRELESS HUMAN AND NON-HUMAN MOTION", filed on Dec. 20, 2023;
(g) U.S. patent application Ser. No. 18/991,634, entitled "WIRELESS SENSING IN NETWORK OF NETWORKS WITH CODED ADDRESSES TO IDENTIFY ORIGINATING DEVICES", filed on Dec. 22, 2024;
(h) U.S. patent application Ser. No. 18/991,629, entitled "WIRELESS SENSING USING MEASUREMENT ENHANCEMENT", filed on Dec. 22, 2024;
(i) U.S. patent application Ser. No. 18/991,632, entitled "WIRELESS SENSING USING CLASSIFIER PROBING AND REFINEMENT", filed on Dec. 22, 2024;
(j) U.S. patent application Ser. No. 19/004,301, entitled "HIGH RESOLUTION HUMAN IMAGING USING NEURAL NETWORK", filed on Dec. 28, 2024;
(k) U.S. patent application Ser. No. 19/260,558, entitled "WIRELESS TRACKING", filed on Jul. 6, 2025;
(l) U.S. Provisional Patent application 63/721,406, entitled "METHOD, APPARATUS AND SYSTEM FOR WIRELESS SENSING", filed on Nov. 15, 2024;
(m) U.S. Provisional Patent application 63/799,327, entitled "DEEP LEARNING BASED WIRELESS SENSING WITH WIRELESS-SPECIFIC DATA AUGMENTATION", filed on May 2, 2025;
(n) U.S. Provisional Patent application 63/902,471, entitled "WIRELESS BASED OCCUPANCY DETECTION AND ACTIVITY MONITORING", filed on Oct. 20, 2025.

TECHNICAL FIELD

The present teaching generally relates to wireless tracking. More specifically, the present teaching relates to passive tracking using wireless signals.

BACKGROUND

The rapid growth of Internet of Things (IoT) devices has driven the development of indoor tracking systems. Existing indoor tracking systems mostly employ vision, acoustics, infrared or radar technologies. However, these technologies have limitations that can hinder their effectiveness and scalability. Vision-based systems can invade privacy and fail in poor lighting conditions, while acoustic systems are often prone to background noise. Infrared systems require LOS to function properly, while radar-based systems require expensive specialized hardware and cover limited areas.

WiFi's affordability and widespread availability make it a popular choice for indoor tracking research and applications, due to its cost-effectiveness and ubiquity. Many WiFi-based indoor tracking systems require specific arrangements of the devices and the complexity of these systems are very high. Some systems require extensive training. In addition, most systems require the tracking target to carry a dedicated device during tracking, which may not be practical or convenient for everyday use.

SUMMARY

The present teaching generally relates to wireless tracking. More specifically, the present teaching relates to passive tracking using wireless signals.

In one embodiment, a method for wireless tracking is described. The method comprises: transmitting, by at least one transmitter, a wireless signal through a wireless channel of a venue; receiving, by a receiver, the wireless signal through the wireless channel of the venue, wherein the received wireless signal differs from the transmitted wireless signal due to the wireless channel and a motion of an object in the venue, wherein neither the at least one transmitter nor the receiver moves with the object; obtaining a time series of channel information (TSCI) of the wireless channel in a time window, wherein the TSCI is generated based on the received wireless signal; generating a plurality of features based on the TSCI over the time window, wherein the plurality of features includes at least: a proximity metric (PM) feature, a motion statistics (MS) feature, and a spatial feature; obtaining a signature map of the venue from a database, wherein each location on the signature map is assigned one or more location signatures representing unique features associated with the location when there is any object at the location; identifying, for each time stamp in the time window, an estimated location of the object in the venue based on the signature map and the plurality of features, and generating a trajectory of the object in the venue over the time window based on the estimated locations of the object.

In another embodiment, a device for wireless tracking is described. The device comprises: a receiver and a processor. The receiver is configured to receive a wireless signal from at least one transmitter through a wireless channel of a venue. The received wireless signal differs from the transmitted wireless signal due to the wireless channel and a motion of an object in the venue. Neither the at least one transmitter nor the receiver moves with the object. The processor is configured to: obtain a time series of channel information (TSCI) of the wireless channel in a time window, wherein the TSCI is generated based on the received wireless signal, generate a plurality of features based on the TSCI over the time window, wherein the plurality of features includes at least: a proximity metric (PM) feature, a motion statistics (MS) feature, and a spatial feature, obtain a signature map of the venue from a database, wherein each location on the signature map is assigned one or more location signatures representing unique features associated with the location when there is any object at the location, identify, for each time stamp in the time window, an estimated location of the object in the venue based on the signature map and the plurality of features, and generate a trajectory of the object in the venue over the time window based on the estimated locations of the object.

In yet another embodiment, a system for wireless tracking is described. The system comprises: at least one transmitter, a receiver and a processor. The at least one transmitter is configured to transmit a wireless signal through a wireless channel of a venue. The receiver is configured to receive the wireless signal through the wireless channel of the venue. The received wireless signal differs from the transmitted wireless signal due to the wireless channel and a motion of an object in the venue. Neither the at least one transmitter nor the receiver moves with the object. The processor is configured to: obtain a time series of channel information (TSCI) of the wireless channel in a time window, wherein the TSCI is generated based on the received wireless signal, generate a plurality of features based on the TSCI over the time window, wherein the plurality of features includes at least: a proximity metric (PM) feature, a motion statistics (MS) feature, and a spatial feature, obtain a signature map of the venue from a database, wherein each location on the signature map is assigned one or more location signatures representing unique features associated with the location when there is any object at the location, identify, for each time stamp in the time window, an estimated location of the object in the venue based on the signature map and the plurality of features, and generate a trajectory of the object in the venue over the time window based on the estimated locations of the object.

Other concepts relate to software for implementing the present teaching on wireless tracking. Additional novel features will be set forth in part in the description which follows, and in part will become apparent to those skilled in the art upon examination of the following and the accompanying drawings or may be learned by production or operation of the examples. The novel features of the present teachings may be realized and attained by practice or use of various aspects of the methodologies, instrumentalities and combinations set forth in the detailed examples discussed below.

BRIEF DESCRIPTION OF DRAWINGS

The methods, systems, and/or devices described herein are further described in terms of example embodiments. These example embodiments are described in detail with reference to the drawings. These embodiments are non-limiting example embodiments, in which like reference numerals represent similar structures throughout the several views of the drawings.

DETAILED DESCRIPTION

Figure 1:
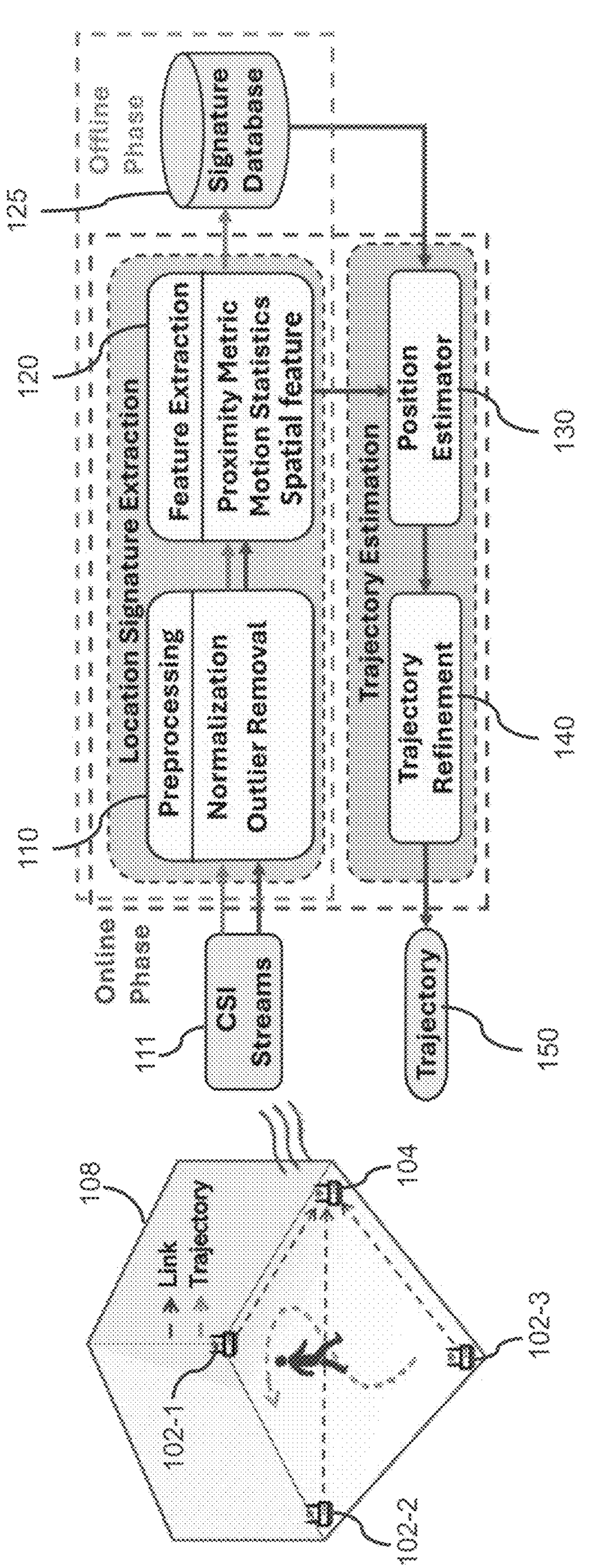
FIG. 1 illustrates an example framework of a system for wireless tracking, according to some embodiments of the present disclosure.

The symbol "/" disclosed herein means "and/or". For example, "A/B" means "A and/or B." In some embodiments, a method/device/system/software of a wireless monitoring system is disclosed. A time series of channel information (CI) of a wireless multipath channel is obtained using a processor, a memory communicatively coupled with processor and a set of instructions stored in memory. The time series of CI (TSCI) may be extracted from a wireless signal transmitted from a Type1 heterogeneous wireless device (e.g. wireless transmitter (TX), "Bot" device) to a Type2 heterogeneous wireless device (e.g. wireless receiver (RX), "Origin" device) in a venue through the channel. The channel is impacted by an expression/motion of an object in venue. A characteristics/spatial-temporal information (STI)/motion information (MI) of object/expression/motion may be computed/monitored based on the TSCI. A task may be performed based on the characteristics/STI/MI. A task-related presentation may be generated in a user-interface (UI) on a device of a user.

Expression may comprise placement, placement of moveable parts, location/speed/acceleration/position/orientation/direction/identifiable place/region/presence/spatial coordinate, static expression/presentation/state/size/length/width/height/angle/scale/curve/surface/area/volume/pose/posture/manifestation/body language, dynamic expression/motion/sequence/movement/activity/behavior/gesture/gait/extension/contraction/distortion/deformation, body expression (e.g. head/face/eye/mouth/tongue/hair/voice/neck/limbs/arm/hand/leg/foot/muscle/moveable parts), surface expression/shape/texture/material/color/electromagnetic (EM) characteristics/visual pattern/wetness/reflectance/translucency/flexibility, material property (e.g. living tissue/hair/fabric/metal/wood/leather/plastic/artificial material/solid/liquid/gas/temperature), expression change, and/or some combination.

Wireless multipath channel may comprise: communication channel, analog frequency channel (e.g. with carrier frequency near 700/800/900 MHz, or 1.8/1.9/2.4/3/5/6/27/60/70+ GHz), coded channel (e.g. in CDMA), and/or channel of wireless/cellular network/system (e.g. WLAN, WiFi, mesh, 4G/LTE/5G/6G/7G/8G, Bluetooth, Zigbee, UWB, RFID, microwave). It may comprise multiple channels, which may be consecutive (e.g. adjacent/overlapping bands) or non-consecutive (e.g. non-overlapping bands, 2.4 GHz/5 GHz). While channel is used to transmit wireless signal and perform sensing measurements, data (e.g. TSCI/feature/component/characteristics/STI/MI/analytics/task outputs, auxiliary/non-sensing data/network traffic) may be communicated/transmitted in channel.

Wireless signal may comprise a series of probe signals. It may be any of: EM radiation, radio frequency (RF)/light/bandlimited/baseband signal, signal in licensed/unlicensed/ISM band, wireless/mobile/cellular/optical communication/network/mesh/downlink/uplink/unicast/multicast/broadcast signal. It may be compliant to standard/protocol (e.g. WLAN, WWAN, WPAN, WBAN, international/national/industry/defacto, IEEE/802/802.11/15/16, WiFi, 802.11n/ac/ax/be/bf, 3G/4G/LTE/5G/6G/7G/8G, 3GPP/Bluetooth/BLE/Zigbee/NFC/RFID/UWB/WiMax). A probe signal may comprise any of: protocol/standard/beacon/pilot/sounding/excitation/illumination/handshake/synchronization/reference/source/motion probe/detection/sensing/management/control/data/null-data/beacon/pilot/request/response/association/reassociation/disassociation/authentication/action/report/poll/announcement/extension/enquiry/acknowled gement frame/packet/signal, and/or null-data-frame (NDP)/RTS/CTS/QoS/CF-Poll/CF-Ack/block acknowledgement/reference/training/synchronization. It may comprise line-of-sight (LOS)/non-LOS components (or paths/links). It may have data embedded. Probe signal may be replaced by (or embedded in) data signal. Each frame/packet/signal may comprise: preamble/header/payload. It may comprise: training sequence, short (STF)/long (LTF) training field, L-STF/L-LTF/L-SIG/HE-STF/HE-LTF/HE-SIG-A/HE-SIG-B, channel estimation field (CEF). It may be used to transfer power wirelessly from Type1 device to Type2 device. Sounding rate of signal may be adjusted to control amount of transferred power. Probe signals may be sent in burst.

TSCI may be extracted/obtained (e.g. by IC/chip) from wireless signal at a layer of Type2 device (e.g. layer of OSI reference model, PHY/MAC/data link/logical link control/network/transport/session/presentation/application layer, TCP/IP/internet/link layer). It may be extracted from received wireless/derived signal. It may comprise wireless sensing measurements obtained in communication protocol (e.g. wireless/cellular communication standard/network, 4G/LTE/5G/6G/7G/8G, WiFi, IEEE 802.11/11bf/15/16). Each CI may be extracted from a probe/sounding signal, and may be associated with time stamp. TSCI may be associated with starting/stopping time/duration/amount of CI/sampling/sounding frequency/period. A motion detection/sensing signal may be recognized/identified base on probe signal. TSCI may be stored/retrieved/accessed/preprocessed/processed/postprocessed/conditioned/analyzed/monitored. TSCI/features/components/characteristics/STI/MI/analytics/task outcome may be communicated to edge/cloud server/Type1/Type2/hub/data aggregator/another device/system/network.

Type1/Type2 device may comprise components (hardware/software) such as electronics/chip/integrated circuit (IC)/RF circuitry/antenna/modem/TX/RX/transceiver/RF interface (e.g. 2.4/5/6/27/60/70+ GHz radio/front/back haul radio)/network/interface/processor/memory/module/circuit/board/software/firmware/connectors/structure/enclosure/housing/structure. It may comprise access point (AP)/base-station/mesh/router/repeater/hub/wireless station/client/terminal/"Origin Satellite"/"Tracker Bot", and/or internet-of-things (IoT)/appliance/wearable/accessory/peripheral/furniture/amenity/gadget/vehicle/module/wireless- enabled/unicast/multicast/broadcasting/node/hub/target/sensor/portable/mobile/cellular/communication/motion-detection/source/destination/standard-compliant device. It may comprise additional attributes such as auxiliary functionality/network connectivity/purpose/brand/model/appearance/form/shape/color/material/specification. It may be heterogeneous because the above (e.g. components/device types/additional attributes) may be different for different Type1 (or Type2) devices.

Type1/Type2 devices may/may not be authenticated/associated/collocated. They may be same device. Type1/Type2/portable/nearby/another device, sensing/measurement session/link between them, and/or object/expression/motion/characteristics/STI/MI/task may be associated with an identity/identification/identifier (ID) such as UUID, associated/unassociated STA ID (ASID/USID/AID/UID). Type2 device may passively observe/monitor/receive wireless signal from Type1 device without establishing connection (e.g. association/authentication/handshake) with, or requesting service from, Type1 device. Type1/Type2 device may move with object/another object to be tracked.

Type1 (TX) device may function as Type2 (RX) device temporarily/sporadically/continuously/repeatedly/interchangeably/alternately/simultaneously/contemporaneously/concurrently; and vice versa. Type1 device may be Type2 device. A device may function as Type1/Type2 device temporarily/sporadically/continuously/repeatedly/simultaneously/concurrently/contemporaneously. There may be multiple wireless nodes each being Type1/Type2 device. TSCI may be obtained between two nodes when they exchange/communicate wireless signals. Characteristics/STI/MI of object may be monitored individually based on a TSCI, or jointly based on multiple TSCI.

Motion/expression of object may be monitored actively with Type1/Type2 device moving with object (e.g. wearable devices/automated guided vehicle/AGV), or passively with Type1/Type2 devices not moving with object (e.g. both fixed devices).

Task may be performed with/without reference to reference/trained/initial database/profile/baseline that is trained/collected/processed/computed/transmitted/stored in training phase. Database may be re-training/updated/reset.

Presentation may comprise UI/GUI/text/message/form/webpage/visual/image/video/graphics/animation/graphical/symbol/emoticon/sign/color/shade/sound/music/speech/audio/mechanical/gesture/vibration/haptics presentation. Time series of characteristic/STI/MI/task outcome/another quantity may be displayed/presented in presentation. Any computation may be performed/shared by processor (or logic unit/chip/IC)/Type1/Type2/user/nearby/another device/local/edge/cloud server/hub/data/signal analysis subsystem/sensing initiator/response/SBP initiator/responder/AP/non-AP. Presentation may comprise any of: monthly/weekly/daily/simplified/detailed/cross-sectional/small/large/form-factor/color-coded/comparative/summary/web view, animation/voice announcement/another presentation related to periodic/repetition characteristics of repeating motion/expression.

Multiple Type1 (or Type 2) devices may interact with a Type2 (or Type1) device. The multiple Type1 (or Type2) devices may be synchronized/asynchronous, and/or may use same/different channels/sensing parameters/settings (e.g. sounding frequency/bandwidth/antennas). Type2 device may receive another signal from Type1/another Type1 device. Type1 device may transmit another signal to Type2/ another Type2 device. Wireless signals sent (or received) by them may be sporadic/temporary/continuous/repeated/synchronous/simultaneous/concurrent/contemporaneous. They may operate independently/collaboratively. Their data (e.g. TSCI/feature/characteristics/STI/MI/intermediate task outcomes) may be processed/monitored/analyzed independently or jointly/collaboratively.

Any devices may operate based on some state/internal state/system state. Devices may communicate directly, or via another/nearby/portable device/server/hub device/cloud server. Devices/system may be associated with one or more users, with associated settings. Settings may be chosen/selected/pre-programmed/changed/adjusted/modified/varied over time. The method may be performed/executed in shown order/another order. Steps may be performed in parallel/iterated/repeated. Users may comprise human/adult/older adult/man/woman/juvenile/child/baby/pet/animal/creature/machine/computer module/software. Step/operation/processing may be different for different devices (e.g. based on locations/orientation/direction/roles/user-related characteristics/settings/configurations/available resources/bandwidth/power/network connection/hardware/software/processor/co-processor/memory/battery life/antennas/directional antenna/power setting/device parameters/characteristics/conditions/status/state). Any/all device may be controlled/coordinated by a processor (e.g. associated with Type1/Type2/nearby/portable/another device/server/designated source). Some device may be physically in/of/attached to a common device.

Type1 (or Type2) device may be capable of wirelessly coupling with multiple Type2 (or Type1) devices. Type1 (or Type2) device may be caused/controlled to switch/establish wireless coupling (e.g. association/authentication) from Type2 (or Type1) device to another Type2 (or another Type1) device. The switching may be controlled by server/hub device/processor/Type1 device/Type2 device. Radio channel may be different before/after switching. A second wireless signal may be transmitted between Type1 (or Type2) device and second Type2 (or second Type1) device through the second channel. A second TSCI of second channel may be extracted/obtained from second signal. The first/second signals, first/second channels, first/second Type1 device, and/or first/second Type2 device may be same/similar/co-located.

Type1 device may transmit/broadcast wireless signal to multiple Type2 devices, with/without establishing connection (association/authentication) with individual Type2 devices. It may transmit to a particular/common MAC address, which may be MAC address of some device (e.g. dummy receiver). Each Type2 device may adjust to particular MAC address to receive wireless signal. Particular MAC address may be associated with venue, which may be recorded in an association table of an Association Server (e.g. hub device). Venue may be identified by Type1 device/Type2 device based on wireless signal received at particular MAC address.

For example, Type2 device may be moved to a new venue. Type1 device may be newly set up in venue such that Type1 and Type2 devices are not aware of each other. During set up, Type1 device may be instructed/guided/caused/controlled (e.g. by dummy receiver, hardware pin setting/connection, stored setting, local setting, remote setting, downloaded setting, hub device, and/or server) to send wireless signal (e.g. series of probe signals) to particular MAC address. Upon power up, Type2 device may scan for probe signals according to a table of MAC addresses (e.g. stored in designated source, server, hub device, cloud server) that may be used for broadcasting at different locations (e.g. different MAC address used for different venue such as house/office/enclosure/floor/multi-storey building/store/airport/mall/stadium/hall/station/subway/lot/area/zone/region/district/city/country/continent). When Type2 device detects wireless signal sent to particular MAC address, it can use the table to identify venue.

Channel may be selected from a set of candidate/selectable/admissible channels. Candidate channels may be associated with different frequency bands/bandwidth/carrier frequency/modulation/wireless standards/coding/encryption/payload characteristics/network/ID/SSID/characteristics/settings/parameters. Particular MAC address/selected channel may be changed/adjusted/varied/modified overtime (e.g. according to time table/rule/policy/mode/condition/situation/change). Selection/change may be based on availability/collision/traffic pattern/co-channel/inter-channel interference/effective bandwidth/random selection/pre-selected list/plan. It may be done by a server (e.g. hub device). They may be communicated (e.g. from/to Type1/Type2/hub/another device/local/edge/cloud server).

Wireless connection (e.g. association/authentication) between Type1 device and nearby/portable/another device may be established (e.g. using signal handshake). Type1 device may send first handshake signal (e.g. sounding frame/probe signal/request-to-send RTS) to the nearby/portable/another device. Nearby/portable/another device may reply to first signal by sending second handshake signal (e.g. command/clear-to-send/CTS) to Type1 device, triggering Type1 device to transmit/broadcast wireless signal to multiple Type2 devices without establishing connection with the Type2 devices. Second handshake signals may be response/acknowledge (e.g. ACK) to first handshake signal. Second handshake signal may contain information of venue/Type1 device. Nearby/portable/another device may be a dummy device with purpose (e.g. primary purpose, secondary purpose) to establish wireless connection with Type1 device, to receive first signal, or send second signal. Nearby/portable/another device may be physically attached to Type1 device.

In another example, nearby/portable/another device may send third handshake signal to Type1 device triggering Type1 device to broadcast signal to multiple Type2 devices without establishing connection with them. Type1 device may reply to third signal by transmitting fourth handshake signal to the another device.

Nearby/portable/another device may be used to trigger multiple Type1 devices to broadcast. It may have multiple RF circuitries to trigger multiple transmitters in parallel. Triggering may be sequential/partially sequential/partially/fully parallel. Parallel triggering may be achieved using additional device (s) to perform similar triggering in parallel to nearby/portable/another device. After establishing connection with Type1 device, nearby/portable/another device may suspend/stop communication with Type1 device. It may enter an inactive/hibernation/sleep/stand-by/low-power/OFF/power-down mode. Suspended communication may be resumed. Nearby/portable/another device may have the particular MAC address and Type1 device may send signal to particular MAC address.

The (first) wireless signal may be transmitted by a first antenna of Type1 device to some first Type2 device through a first channel in a first venue. A second wireless signal may be transmitted by a second antenna of Type1 device to some second Type2 device through a second channel in a second venue. First/second signals may be transmitted at first/second (sounding) rates respectively, perhaps to first/second MAC addresses respectively. Some first/second channels/ signals/rates/MAC addresses/antennas/Type2 devices may be same/different/synchronous/asynchronous. First/second venues may have same/different sizes/shape/multipath characteristics. First/second venues/immediate areas around first/second antennas may overlap. First/second channels/signals may be WiFi+LTE (one being WiFi, one being LTE), or WiFi+WiFi, or WiFi (2.4 GHz)+WiFi (5 GHz), or WiFi (5 GHz, channel=a1, BW=a2)+WiFi (5 GHz/channel=b1, BW=b2). Some first/second items (e.g. channels/signals/rates/MAC addresses/antennas/Type1/Type2 devices) may be changed/adjusted/varied/modified overtime (e.g. based on time table/rule/policy/mode/condition/situation/another change).

Each Type1 device may be signal source of multiple Type2 devices (i.e. it sends respective probe signal to respective Type2 device). Each respective Type2 device may choose asynchronously the Type1 device from among all Type1 devices as its signal source. TSCI may be obtained by each respective Type2 device from respective series of probe signals from Type1 device. Type2 device may choose Type1 device from among all Type1 devices as its signal source (e.g. initially) based on identity/identification/identifier of Type1/Type2 device, task, past signal sources, history, characteristics, signal strength/quality, threshold for switching signal source, and/or information of user/account/profile/access info/parameters/input/requirement/criteria.

Database of available/candidate Type1 (or Type2) devices may be initialized/maintained/updated by Type2 (or Type1) device. Type2 device may receive wireless signals from multiple candidate Type1 devices. It may choose its Type1 device (i.e. signal source) based on any of: signal quality/strength/regularity/channel/traffic/characteristics/properties/states/task requirements/training task outcome/MAC addresses/identity/identifier/past signal source/history/user instruction/another consideration.

An undesirable/bad/poor/problematic/unsatisfactory/unacceptable/intolerable/faulty/demanding/undesirable/inadequate/lacking/inferior/unsuitable condition may occur when (1) timing between adjacent probe signals in received wireless signal becomes irregular, deviating from agreed sounding rate (e.g. time perturbation beyond acceptable range), and/or (2) processed/signal strength of received signal is too weak (e.g. below third threshold, or below fourth threshold for significant percentage of time), wherein processing comprises any lowpass/bandpass/highpass/median/moving/weighted average/linear/nonlinear/smoothing filtering. Any thresholds/percentages/parameters may be time-varying. Such condition may occur when Type1/Type2 device become progressively far away, or when channel becomes congested.

Some settings (e.g. Type1-Type2 device pairing/signal source/network/association/probe signal/sounding rate/scheme/channel/bandwidth/system state/TSCI/TSMA/task/task parameters) may be changed/varied/adjusted/modified. Change may be according to time table/rule/policy/mode/condition (e.g. undesirable condition)/another change. For example, sounding rate may normally be 100 Hz, but changed to 1000 Hz in demanding situations, and to 1 Hz in low power/standby situation.

Settings may change based on task requirement (e.g. 100 Hz normally and 1000 Hz momentarily for 20 seconds). In task, instantaneous system may be associated adaptively/dynamically to classes/states/conditions (e.g. low/normal/high priority/emergency/critical/regular/privileged/non-subscription/subscription/paying/non-paying). Settings (e.g. sounding rate) may be adjusted accordingly. Change may be controlled by: server/hub/Type1/Type2 device. Scheduled changes may be made according to time table. Changes may be immediate when emergency is detected, or gradual when developing condition is detected.

Characteristics/STI/MI may be monitored/analyzed individually based on a TSCI associated with a particular Type1/Type2 device pair, or jointly based on multiple TSCI associated multiple Type1/Type2 pairs, or jointly based on any TSCI associated with the particular Type2 device and any Type1 devices, or jointly based on any TSCI associated with the particular Type1 device and any Type2 devices, or globally based on any TSCI associated with any Type1/Type2 devices.

A classifier/classification/recognition/detection/estimation/projection/feature extraction/processing/filtering may be applied (e.g. to CI/CI-feature/characteristics/STI/MI), and/or trained/re-trained/updated. In a training stage, training may be performed based on multiple training TSCI of some training wireless multipath channel, or characteristic/STI/MI computed from training TSCI, the training TSCI obtained from training wireless signals transmitted from training Type1 devices and received by training Type2 devices. Re-training/updating may be performed in an operating stage based on training TSCI/current TSCI. There may be multiple classes (e.g. groupings/categories/events/motions/expression/activities/objects/locations) associated with venue/regions/zones/location/environment/home/office/building/warehouse/facility object/expression/motion/movement/process/event/manufacturing/assembly-line/maintenance/repairing/navigation/object/emotional/mental/state/condition/stage/gesture/gait/action/motion/presence/movement/daily/activity/history/event.

Classifier may comprise linear/nonlinear/binary/multiclass/Bayes classifier/Fisher linear discriminant/logistic regression/Markov chain/Monte Carlo/deep/neural network/perceptron/self-organization maps/boosting/meta algorithm/decision tree/random forest/genetic programming/kernel learning/KNN/support vector machine (SVM).

Feature extraction/projection may comprise any of: subspace projection/principal component analysis (PCA)/independent component analysis (ICA)/vector quantization/singular value decomposition (SVD)/eigen-decomposition/eigenvalue/time/frequency/orthogonal/non-orthogonal decomposition, processing/preprocessing/postprocessing. Each CI may comprise multiple components (e.g. vector/combination of complex values). Each component may be preprocessed to give magnitude/phase or a function of such.

Feature may comprise: output of feature extraction/projection, amplitude/magnitude/phase/energy/power/strength/intensity, presence/absence/proximity/likelihood/histogram, time/period/duration/frequency/component/decomposition/projection/band, local/global/maximum (max)/minimum (min)/zero-crossing, repeating/periodic/typical/habitual/one-time/atypical/abrupt/mutually-exclusive/evolving/transient/changing/time/related/correlated feature/pattern/trend/profile/events/tendency/inclination/behavior, cause-and-effect/short-term/long-term/correlation/statistics/frequency/period/duration, motion/movement/location/map/coordinate/height/speed/acceleration/angle/rotation/size/volume, suspicious/dangerous/alarming event/warning/belief/proximity/collision, tracking/breathing/heartbeat/gait/action/event/statistical/hourly/daily/weekly/monthly/yearly parameters/statistics/analytics, well-being/health/disease/medical statistics/analytics, an early/instantaneous/contemporaneous/delayed indication/suggestion/sign/indicator/verifier/detection/symptom of a state/condition/situation/disease/biometric, baby/patient/machine/device/temperature/vehicle/parking lot/venue/lift/elevator/spatial/ road/fluid flow/home/room/office/house/building/warehouse/storage/system/ventilation/fan/pipe/duct/people/human/car/boat/truck/airplane/drone/downtown/crowd/impulsive event/cyclo-stationary/environment/vibration/material/surface/3D/2D/local/global, and/or another measurable quantity/variable. Feature may comprise monotonic function of feature, or sliding aggregate of features in sliding window.

Training may comprise AI/machine/deep/supervised/unsupervised/discriminative training/auto-encoder/linear discriminant analysis/regression/clustering/tagging/labeling/Monte Carlo computation.

A current event/motion/expression/object in venue at current time may be classified by applying classifier to current TSCI/characteristics/STI/MI obtained from current wireless signal received by Type2 device in venue from Type1 devices in an operating stage. If there are multiple Type1/Type2 devices, some/all (or their locations/antenna locations) may be a permutation of corresponding training Type1/Type2 devices (or locations/antenna locations). Type1/Type2 device/signal/channel/venue/object/motion may be same/different from corresponding training entity. Classifier may be applied to sliding windows. Current TSCI/characteristics/STI/MI may be augmented by training TSCI/characteristics/STI/MI (or fragment/extract) to bootstrap classification/classifier.

A first section/segment (with first duration/starting/ending time) of a first TSCI (associated with first Type1-Type2 device pair) may be aligned (e.g. using dynamic time warping/DTW/matched filtering, perhaps based on some mismatch/distance/similarity score/cost, or correlation/autocorrelation/cross-correlation) with a second section/segment (with second duration/starting/ending time) of a second TSCI (associated with second Type1-Type2 device pair), with each CI in first section mapped to a CI in second section. First/second TSCI may be preprocessed. Some similarity score (component/item/link/segment-wise) may be computed. The similarity score may comprise any of: mismatch/distance/similarity score/cost. Component-wise similarity score may be computed between a component of first item (CI/feature/characteristics/STI/MI) of first section and corresponding component of corresponding mapped item (second item) of second section. Item-wise similarity score may be computed between first/second items (e.g. based on aggregate of corresponding component-wise similarity scores). An aggregate may comprise any of: sum/weighted sum, weighted average/robust/trimmed mean/arithmetic/geometric/harmonic mean, median/mode. Link-wise similarity score may be computed between first/second items associated with a link (TX-RX antenna pair) of first/second Type1-Type2 device pairs (e.g. based on aggregate of corresponding item-wise similarity scores). Segment-wise similarity score may be computed between first/second segments (e.g. based on aggregate of corresponding link-wise similarity scores). First/second segment may be sliding.

In DTW, a function of any of: first/second segment, first/second item, another first (or second) item of first (or second) segment, or corresponding timestamp/duration/difference/differential, may satisfy a constraint. Time difference between first/second items may be constrained (e.g. upper/lower bounded). First (or second) section may be entire first (or second) TSCI. First/second duration/starting/ending time may be same/different.

In one example, first/second Type1-Type2 device pairs may be same and first/second TSCI may be same/different. When different, first/second TSCI may comprise a pair of current/reference, current/current or reference/reference TSCI. For "current/reference", first TSCI may be current TSCI obtained in operating stage and second TSCI may be reference TSCI obtained in training stage. For "reference/reference", first/second TSCI may be two TSCI obtained during training stage (e.g. for two training events/states/classes). For "current/current", first/second TSCI may be two TSCI obtained during operating stage (e.g. associated with two different antennas, or two measurement setups). In another example, first/second Type1-Type2 device pairs may be different, but share a common device (Type1 or Type2).

Aligned first/second segments (or portion of each) may be represented as first/second vectors. Portion may comprise all items (for "segment-wise"), or all items associated with a TX-RX link (for "link-wise"), or an item (for "item-wise"), or a component of an item (for "component-wise"). Similarity score may comprise combination/aggregate/function of any of: inner product/correlation/autocorrelation/correlation indicator/covariance/discriminating score/distance/Euclidean/absolute/L_k/weighted distance (between first/second vectors). Similarity score may be normalized by vector length. A parameter derived from similarity score may be modeled with a statistical distribution. A scale/location/another parameter of the statistical distribution may be estimated.

Recall there may be multiple sliding segments. Classifier may be applied to a sliding first/second segment pair to obtain a tentative classification result. It may associate current event with a particular class based on one segment pair/tentative classification result, or multiple segment pairs/tentative classification results (e.g. associate if similarity scores prevail (e.g. being max/min/dominant/matchless/most significant/excel) or significant enough (e.g. higher/lower than some threshold) among all candidate classes for N consecutive times, or for a high/low enough percentage, or most/least often in a time period).

Channel information (CI) may comprise any of: signal strength/amplitude/phase/timestamp, spectral power measurement, modem parameters, dynamic beamforming information, transfer function components, radio state, measurable variables, sensing data/measurement, coarse/fine-grained layer information (e.g. PHY/MAC/datalink layer), digital gain/RF filter/frontend-switch/DC offset/correction/IQ-compensation settings, environment effect on wireless signal propagation, channel input-to-output transformation, stable behavior of environment, state profile, wireless channel measurements/received signal strength indicator (RSSI)/channel state information (CSI)/channel impulse response (CIR)/channel frequency response (CFR)/characteristics of frequency components (e.g. subcarriers)/channel characteristics/channel filter response, auxiliary information, data/meta/user/account/access/security/session/status/supervisory/device/network/household/neighborhood/environment/real-time/sensor/stored/encrypted/compressed/protected data, identity/identifier/identification.

Each CI may be associated with timestamp/arrival time/frequency band/signature/phase/amplitude/trend/characteristics, frequency-like characteristics, time/frequency/time-frequency domain element, orthogonal/non-orthogonal decomposition characteristics of signal through channel. Timestamps of TSCI may be irregular and may be corrected (e.g. by interpolation/resampling) to be regular, at least for a sliding time window.

TSCI may be/comprise a link-wise TSCI associated with an antenna of Type1 device and an antenna of Type2 device. For Type1 device with M antennas and Type2 device with N antennas, there may be MN link-wise TSCI.

CI/TSCI may be preprocessed/processed/postprocessed/stored/retrieved/transmitted/received. Some modem/radio state parameter may be held constant. Modem parameters may be applied to radio subsystem and may represent radio state. Motion detection signal (e.g. baseband signal, packet decoded/demodulated from it) may be obtained by processing (e.g. down-converting) wireless signal (e.g. RF/WiFi/LTE/5G/6G signal) by radio subsystem using radio state represented by stored modem parameters. Modem parameters/radio state may be updated (e.g. using previous modem parameters/radio state). Both previous/updated modem parameters/radio states may be applied in radio subsystem (e.g. to process signal/decode data). In the disclosed system, both may be obtained/compared/analyzed/processed/monitored.

Each CI may comprise N1 CI components (CIC) (e.g. time/frequency domain component, decomposition components), each with corresponding CIC index. Each CIC may comprise a real/imaginary/complex quantity, magnitude/phase/Boolean/flag, and/or some combination/subset. Each CI may comprise a vector/matrix/set/collection of CIC. CIC of TSCI associated with a particular CIC index may form a CIC time series. TSCI may be divided into N1 time series of CIC (TSCIC), each associated with respective CIC index. Characteristics/STI/MI may be monitored based on TSCIC. Some TSCIC may be selected based on some criteria/cost function/signal quality metric (e.g. SNR, interference level) for further processing.

Multi-component characteristics/STI/MI of multiple TSCIC (e.g. two components with indices 6 and 7, or three components indexed at 6, 7, 10) may be computed. In particular, k-component characteristics may be a function of k TSCIC with k corresponding CIC indices. With k=1, it is single-component characteristics which may constitute/form a one-dimensional (1D) function as CIC index spans all possible values. For k=2, two-component characteristics may constitute/form a 2D function. In special case, it may depend only on difference between the two indices. In such case, it may constitute 1D function. A total characteristics may be computed based on one or more multi-component characteristics (e.g. weighted average/aggregate). Characteristics/STI/MI of object/motion/expression may be monitored based on any multi-component characteristics/total characteristics.

Characteristics/STI/MI may comprise: instantaneous/short-/long- term/historical/repetitive/repeated/repeatable/recurring/periodic/pseudoperiodic/regular/habitual/incremental/average/initial/final/current/past/future/predicted/changing/deviational/change/time/frequency/orthogonal/non- orthogonal/transform/decomposition/deterministic/stochastic/probabilistic/dominant/key/prominent/representative/characteristic/significant/insignificant/indicative/common/averaged/shared/typical/prototypical/persistent/abnormal/a brupt/impulsive/sudden/unusual/unrepresentative/atypical/suspicious/dangerous/alarming/evolving/transient/one-time quantity/characteristics/analytics/feature/information, cause-and-effect, correlation indicator/score, auto/cross correlation/covariance, autocorrelation function (ACF), spectrum/spectrogram/power spectral density, time/frequency function/transform/projection, initial/final/temporal/change/trend/pattern/tendency/inclination/behavior/activity/history/profile/event, location/position/localization/spatial coordinate/change on map/path/navigation/tracking, linear/rotational/horizontal/vertical/location/distance/displacement/height/speed/velocity/acceleration/change/angular speed, direction/orientation, size/length/width/height/azimuth/area/volume/capacity, deformation/transformation, object/motion direction/angle/shape/form/shrinking/expanding, behavior/activity/movement, occurrence, fall-down/accident/security/event, period/frequency/rate/cycle/rhythm/count/quantity, timing/duration/interval, starting/initiating/ending/current/past/next time/quantity/information, type/grouping/classification/composition, presence/absence/proximity/approaching/receding/entrance/exit, identity/identifier, head/mouth/eye/breathing/heart/hand/handwriting/arm/body/gesture/leg/gait/organ characteristics, tidal volume/depth of breath/airflow rate/inhale/exhale time/ratio, gait/walking/tool/machine/complex motion, signal/motion characteristic/information/feature/statistics/parameter/magnitude/phase/degree/dynamics/anomaly/variability/detection/estimation/recognition/identification/indication, slope/derivative/higher order derivative of function/feature/mapping/transformation of another characteristics, mismatch/distance/similarity score/cost/metric, Euclidean/statistical/weighted distance, L1/L2/Lk norm, inner/outer product, tag, test quantity, consumed/unconsumed quantity, state/physical/health/well-being/emotional/mental state, output responses, any composition/combination, and/or any related characteristics/information/combination.

Test quantities may be computed. Characteristics/STI/MI may be computed/monitored based on CI/TSCI/features/similarity scores/test quantities. Static (or dynamic) segment/profile may be identified/computed/analyzed/monitored/extracted/obtained/marked/presented/indicated/highlighted/stored/communicated by analyzing CI/TSCI/features/functions of features/test quantities/characteristics/STI/MI (e.g. target motion/movement presence/detection/estimation/recognition/identification). Test quantities may be based on CI/TSCI/features/functions of features/characteristics/STI/MI. Test quantities may be processed/tested/analyzed/compared.

Test quantity may comprise any/any function of: data/vector/matrix/structure, characteristics/STI/MI, CI information (CII, e.g. CI/CIC/feature/magnitude/phase), directional information (DI, e.g. directional CII), dominant/representative/characteristic/indicative/key/archetypal/example/paradigmatic/prominent/common/shared/typical/prototypical/averaged/regular/persistent/usual/normal/atypical/unusual/abnormal/unrepresentative data/vector/matrix/structure, similarity/mismatch/distance score/cost/metric, auto/cross correlation/covariance, sum/mean/average/weighted/trimmed/arithmetic/geometric/harmonic mean, variance/deviation/absolute/square deviation/averaged/median/total/standard deviation/derivative/slope/variation/total/absolute/square variation/spread/dispersion/variability, divergence/skewness/kurtosis/range/interquartile range/coefficient of variation/dispersion/L-moment/quartile coefficient of dispersion/mean absolute/square difference/Gini coefficient/relative mean difference/entropy/maximum (max)/minimum (min)/median/percentile/quartile, variance-to-mean ratio, max-to-min ratio, variation/regularity/similarity measure, transient event/behavior, statistics/mode/likelihood/histogram/probability distribution function (pdf)/moment generating function/expected function/value, behavior, repeatedness/periodicity/pseudo-periodicity, impulsiveness/suddenness/occurrence/recurrence, temporal profile/characteristics, time/timing/duration/period/frequency/trend/history, starting/initiating/ending time/quantity/count, motion classification/type, change, temporal/frequency/cycle change, etc.

Identification/identity/identifier/ID may comprise: MAC address/ASID/USID/AID/UID/UUID, label/tag/index, web link/address, numeral/alphanumeric ID, name/password/account/account ID, and/or another ID. ID may be assigned (e.g. by software/firmware/user/hardware, hardwired, via dongle). ID may be stored/retrieved (e.g. in database/memory/cloud/edge/local/hub server, stored locally/remotely/permanently/temporarily). ID may be associated with any of: user/customer/household/information/data/address/phone number/social security number, user/customer number/record/account, timestamp/duration/timing. ID may be made available to Type1/Type2 device/sensing/SBP initiator/responder. ID may be for registration/initialization/communication/identification/verification/detection/recognition/authentication/access control/cloud access/networking/social networking/logging/recording/cataloging/classification/tagging/association/pairing/transaction/electronic transaction/intellectual property control (e.g. by local/cloud/server/hub, Type1/Type2/nearby/user/another device, user).

Object may be person/pet/animal/plant/machine/user, baby/child/adult/older person, expert/specialist/leader/commander/manager/personnel/staff/officer/doctor/nurse/worker/teacher/technician/serviceman/repairman/passenger/patient/customer/student/traveler/inmate/high-value person/, object to be tracked, vehicle/car/AGV/drone/robot/wagon/transport/remote-controlled machinery/cart/moveable objects/goods/items/material/parts/components/machine/lift/elevator, merchandise/goods/cargo/people/items/food/package/luggage/equipment/cleaning tool in/on workflow/assembly-line/warehouse/factory/store/supermarket/distribution/logistic/transport/manufacturing/retail/wholesale/business center/facility/hub, phone/computer/laptop/tablet/dongle/plugin/companion/tool/peripheral/accessory/wearable/furniture/appliance/amenity/gadget, IoT/networked/smart/portable devices, watch/glasses/speaker/toys/stroller/keys/wallet/purse/handbag/backpack, goods/cargo/luggage/equipment/motor/machine/utensil/table/chair/air-conditioner/door/window/heater/fan, light/fixture/stationary object/television/camera/audio/video/surveillance equipment/parts, ticket/parking/toll/airplane ticket, credit/plastic/access card, object with fixed/changing/no form, mass/solid/liquid/gas/fluid/smoke/fire/flame, signage, electromagnetic (EM) source/medium, and/or another object.

Object may have multiple parts, each with different movement (e.g. position/location/direction change). Object may be a person walking forward. While walking, his left/right hands may move in different directions, with different instantaneous motion/speed/acceleration.

Object may/may not be communicatively coupled with some network, such as WiFi, MiFi, 4G/LTE/5G/6G/7G/8G, Bluetooth/NFC/BLE/WiMax/Zigbee/mesh/adhoc network. Object may be bulky machinery with AC power supply that is moved during installation/cleaning/maintenance/renovation. It may be placed on/in moveable platforms such as elevator/conveyor/lift/pad/belt/robot/drone/forklift/car/boat/vehicle. Type1/Type2 device may attach to/move with object. Type1/Type2 device may be part of/embedded in portable/another device (e.g. module/device with module, which may be large/sizeable/small/heavy/bulky/light, e.g. coin-sized/cigarette-box-sized). Type1/Type2/portable/another device may/may not be attached to/move with object, and may have wireless (e.g. via Bluetooth/BLE/Zigbee/NFC/WiFi) or wired (e.g. USB/micro-USB/Firewire/HDMI) connection with a nearby device for network access (e.g. via WiFi/cellular network). Nearby device may be object/phone/AP/IoT/device/appliance/peripheral/amenity/furniture/vehicle/gadget/wearable/networked/computing device. Nearby device may be connected to some server (e.g. cloud server via network/internet). It may/may not be portable/moveable, and may/may not move with object. Type1/Type2/portable/nearby/another device may be powered by battery/solar/DC/AC/other power source, which may be replaceable/non-replaceable, and rechargeable/non-rechargeable. It may be wirelessly charged.

Type1/Type2/portable/nearby/another device may comprise any of: computer/laptop/tablet/pad/phone/printer/monitor/battery/antenna, peripheral/accessory/socket/plug/charger/switch/adapter/dongle, internet-of-thing (IoT), TV/sound bar/HiFi/speaker/set-top box/remote control/panel/gaming device, AP/cable/broadband/router/repeater/extender, appliance/utility/fan/refrigerator/washer/dryer/microwave/oven/stove/range/light/lamp/tube/pipe/tap/lighti ng/air-conditioner/heater/smoke detector, wearable/watch/glasses/goggle/button/bracelet/chain/jewelry/ring/belt/clothing/garment/fabric/shirt/pant/dress/glove/handwear/shoe/footwear/ha t/headwear/bag/purse/wallet/makeup/cosmetic/ornament/book/magazine/paper/stationary/signage/poster/d isplay/printed matter, furniture/fixture/table/desk/chair/sofa/bed/cabinet/shelf/rack/storage/box/bucket/basket/packaging/carriage/tile/shingle/brick/block/mat/panel/curtain/cushion/pad/carpet/material/building material/glass, amenity/sensor/clock/pot/pan/ware/container/bottle/can/utensil/plate/cup/bowl/toy/ball/tool/pen/racket/lock/bell/camera/microphone/painting/frame/mir ror/coffee-maker/door/window, food/pill/medicine, embeddable/implantable/gadget/instrument/equipment/device/apparatus/machine/controller/mechanical tool, garage-opener, key/plastic/payment/credit card/ticket, solar panel, key tracker, fire-extinguisher, garbage can/bin, WiFi-enabled device, smart device/machine/machinery/system/house/office/building/warehouse/facility/vehicle/car/bicycle/motorcycle/boat/vessel/airplane/cart/wagon, home/vehicle/office/factory/building/manufacturing/production/computing/security/another device.

One/two/more of Type1/Type2/portable/nearby/another device/server may determine an initial characteristics/STI/MI of object, and/or may share intermediate information. One of Type1/Type2 device may move with object (e.g. "Tracker Bot"). The other one of Type1/Type2 device may not move with object (e.g. "Origin Satellite", "Origin Register"). Either may have known characteristics/STI/MI. Initial STI/MI may be computed based on known STI/MI.

Venue may be any space such as sensing area, room/house/home/office/workplace/building/facility/warehouse/factory/store/vehicle/property, indoor/outdoor/enclosed/semi-enclosed/open/semi-open/closed/over-air/floating/underground space/area/structure/enclosure, space/area with wood/glass/metal/material/structure/frame/beam/panel/column/wall/floor/door/ceiling/window/cavity/gap/opening/reflection/refraction medium/fluid/construction material/fixed/adjustable layout/shape, human/animal/plant body/cavity/organ/bone/blood/vessel/air-duct/windpipe/teeth/soft/hard/rigid/non-rigid tissue, manufacturing/repair/maintenance/mining/parking/storage/transportation/shipping/logistic/sports/entertainment/amusement/public/recreational/government/community/seniors/elderly care/geriatric/space facility/terminal/hub, distribution center/store, machine/engine/device/assembly line/workflow, urban/rural/suburban/metropolitan area, staircase/escalator/elevator/hallway/walkway/tunnel/cave/cavern/channel/duct/pipe/tube/lift/well/pathway/roof/basement/den/alley/road/path/highway/sewage/ventilation system/network, car/truck/bus/van/container/ship/boat/submersible/train/tram/airplane/mobile home, stadium/city/playground/park/field/track/court/gymnasium/hall/mart/market/supermarket/ plaza/square/construction site/hotel/museum/school/hospital/university/garage/mall/airport/train/bus station/terminal/hub/platform, valley/forest/wood/terrain/landscape/garden/park/patio/land, and/or gas/oil/water pipe/line. Venue may comprise inside/outside of building/facility. Building/facility may have one/multiple floors, with a portion underground.

A event may be monitored based on TSCI. Event may be object/motion/gesture/gait related, such as fall-down, rotation/hesitation/pause, impact (e.g. person hitting sandbag/door/bed/window/chair/table/desk/cabinet/box/another person/animal/bird/fly/ball/bowling/tennis/soccer/volley ball/football/baseball/basketball), two-body action (e.g. person releasing balloon/catching fish/molding clay/writing paper/typing on computer), car moving in garage, person carrying smart phone/walking around venue, autonomous/moveable object/machine moving around (e.g. vacuum cleaner/utility/self-driving vehicle/car/drone).

Task may comprise: (a) sensing task, any of: monitoring/sensing/detection/recognition/estimation/verification/identification/authentication/classification/locationing/guidance/navigation/tracking/counting of/in any of: object/objects/vehicle/machine/tool/human/baby/elderly/patient/intruder/pet presence/proximity/activity/daily-activity/well-being/breathing/vital sign/heartbeat/health condition/sleep/sleep stage/walking/location/distance/speed/acceleration/navigation/tracking/exercise/safety/danger/fall-down/intrusion/security/life- threat/emotion/movement/motion/degree/pattern/periodic/repeated/cyclo-stationary/stationary/regular/transient/sudden/suspicious motion/irregularity/trend/change/breathing/human biometrics/environment informatics/gait/gesture/room/region/zone/venue, (b) computation task, any of: signal processing/preprocess/postprocessing/conditioning/denoising/calibration/analysis/feature extraction/transformation/mapping/supervised/unsupervised/semi-supervised/discriminative/machine/deep learning/training/clustering/training/PCA/eigen-decomposition/frequency/time/functional decomposition/neural network/map-based/model-based processing/correction/geometry estimation/analytics computation, (c) IoT task, any of: smart task for venue/user/object/human/pet/house/home/office/workplace/building/facility/warehouse/factory/store/vehicle/property/structure/assembly-line/IoT/device/system, energy/power management/transfer, wireless power transfer, interacting/engage with user/object/intruder/human/animal (e.g. presence/motion/gesture/gait/activity/behavior/voice/command/instruction/query/music/sound/image/vide o/location/movement/danger/threat detection/recognition/monitoring/analysis/response/execution/synthesis, generate/retrieve/play/display/render/synthesize dialog/exchange/response/presentation/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), activating/controlling/configuring (e.g. turn on/off/control/lock/unlock/open/close/adjust/configure) a device/system (e.g. vehicle/drone/electrical/mechanical/air-conditioning/heating/lighting/ventilation/clearning/entertainment/IoT/security/siren/access system/device/door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/robot/vacuum cleaner/assembly line), (d) miscellaneous task, any of: transmission/coding/encryption/storage/analysis of data/parameters/analytics/derived data, upgrading/administration/configuration/coordination/broadcasting/synchronization/networking/encryption/communication/protection/compression/storage/database/archiving/query/cloud computing/presentation/augmented/virtual reality/other processing/task. Task may be performed by some of: Type1/Type2/nearby/portable/another device, and/or hub/local/edge/cloud server.

Task may also comprise: detect/recognize/monitor/locate/interpret/analyze/record/store user/visitor/intruder/object/pet, interact/engage/converse/dialog/exchange with user/object/visitor/intruder/human/baby/pet, detect/locate/localize/recognize/monitor/analyze/interpret/learn/train/respond/execute/synthesize/generate/record/store/summarize health/well-being/daily-life/activity/behavior/pattern/exercise/food-intake/restroom visit/work/play/rest/sleep/relaxation/danger/routine/timing/habit/trend/normality/normalcy/anomaly/regularity/irregularity/change/presence/motion/gesture/gait/expression/emotion/state/stage/voice/command/instruction/question/quer y/music/sound/location/movement/fall-down/threat/discomfort/sickness/environment/, generate/retrieve/play/display/render/synthesize dialog/exchange/response/presentation/report/experience/media/multimedia/expression/sound/speech/music/image/imaging/video/animation/webpage/text/message/notification/reminder/enquiry/warning, detect/recognize/monitor/interpret/analyze/record/store user/intruder/object input/motion/gesture/location/activity), detect/check/monitor/locate/manage/control/adjust/configure/lock/unlock/arm/disarm/open/close/fully/partially/activat e/turn on/off some system/device/object (e.g. vehicle/robot/drone/electrical/mechanical/air-conditioning/heating/ventilation/HVAC/lighting/cleaning/entertainment/IoT/security/siren/access systems/devices/items/components, door/window/garage/lift/elevator/escalator/speaker/television/light/peripheral/accessory/wearable/furniture/appliance/amenity/gadget/alarm/camera/gaming/coffee/cooking/heater/fan/housekeeping/home/office machine/device/vacuum cleaner/assembly line/window/garage/door/blind/curtain/panel/solar panel/sun shade), detect/monitor/locate user/pet do something (e.g. sitting/sleeping on sofa/in bedroom/running on treadmill/cooking/watching TV/eating in kitchen/dining room/going upstairs/downstairs/outside/inside/using rest room), do something (e.g. generate message/response/warning/clarification/notification/report) automatically upon detection, do something for user automatically upon detecting user presence, turn on/off/wake/control/adjust/dim light/music/radio/TV/HiFi/STB/computer/speaker/smart device/air-conditioning/ventilation/heating system/curtains/light shades, turn on/off/pre-heat/control coffee-machine/hot-water-pot/cooker/oven/microwave oven/another cooking device, check/manage temperature/setting/weather forecast/telephone/message/mail/system check, present/interact/engage/dialog/converse (e.g. through smart speaker/display/screen; via webpage/email/messaging system/notification system).

When user arrives home by car, task may be to, automatically, detect user/car approaching, open garage/door upon detection, turn on driveway/garage light as user approaches garage, and/or turn on air conditioner/heater/fan. As user enters house, task may be to, automatically, turn on entrance light/off driveway/garage light, play greeting message to welcome user, turn on user's favorite music/radio/news/channel, open curtain/blind, monitor user's mood, adjust lighting/sound environment according to mood/current/imminent event (e.g. do romantic lighting/music because user is scheduled to eat dinner with girlfriend soon) on user's calendar, warm food in microwave that user prepared in morning, do diagnostic check of all systems in house, check weather forecast for tomorrow/news of interest to user, check calendar/to-do list, play reminder, check telephone answering/messaging system/email, give verbal report using dialog system/speech synthesis, and/or remind (e.g. using audible tool such as speakers/HiFi/speech synthesis/sound/field/voice/music/song/dialog system, using visual tool such as TV/entertainment system/computer/notebook/tablet/display/light/color/brightness/patterns symbols, using haptic/virtual reality/gesture/tool, using smart device/appliance/material/furniture/fixture, using server/hub device/cloud/fog/edge server/home/mesh network, using messaging/notification/communication/scheduling/email tool, using UI/GUI, using scent/smell/fragrance/taste, using neural/nervous system/tool, or any combination) user of someone's birthday/call him, prepare/give report. Task may turn on air conditioner/heater/ventilation system in advance, and/or adjust temperature setting of smart thermostat in advance. As user moves from entrance to living room, task may be to turn on living room light, open living room curtain, open window, turn off entrance light behind user, turn on TV/set-top box, set TV to user's favorite channel, and/or adjust an appliance according to user's preference/conditions/states (e.g. adjust lighting, choose/play music to build romantic atmosphere).

When user wakes up in morning, task may be to detect user moving around in bedroom, open blind/curtain/window, turn off alarm clock, adjust temperature from night-time to day-time profile, turn on bedroom light, turn on restroom light as user approaches restroom, check radio/streaming channel and play morning news, turn on coffee machine, preheat water, and/or turn off security system. When user walks from bedroom to kitchen, task may be to turn on kitchen/hallway lights, turn off bedroom/restroom lights, move music/message/reminder from bedroom to kitchen, turn on kitchen TV, change TV to morning news channel, lower kitchen blind, open kitchen window, unlock backdoor for user to check backyard, and/or adjust temperature setting for kitchen.

When user leaves home for work, task may be to detect user leaving, play farewell/have-a-good-day message, open/close garage door, turn on/off garage/driveway light, close/lock all windows/doors (if user forgets), turn off appliance (e.g. stove/microwave/oven), turn on/arm security system, adjust light/air-conditioning/heating/ventilation systems to "away" profile to save energy, and/or send alerts/reports/updates to user's smart phone.

Motion may comprise any of: no-motion, motion sequence, resting/non-moving motion, movement/change in position/location, daily/weekly/monthly/yearly/repeating/activity/behavior/action/routine, transient/time-varying/fall-down/repeating/repetitive/periodic/pseudo-periodic motion/breathing/heartbeat, deterministic/non-deterministic/probabilistic/chaotic/random motion, complex/combination motion, non-/pseudo-/cyclo-/stationary random motion, change in electro-magnetic characteristics, human/animal/plant/body/machine/mechanical/vehicle/drone motion, air-/wind-/weather-/water-/fluid-/ground/sub-surface/seismic motion, man-machine interaction, normal/abnormal/dangerous/warning/suspicious motion, imminent/rain/fire/flood/tsunami/explosion/collision, head/facial/eye/mouth/tongue/neck/finger/hand/arm/shoulder/upper/lower/body/chest/abdominal/hip/leg/foot/joint/knee/elbow/skin/below-skin/subcutaneous tissue/blood vessel/intravenous/organ/heart/lung/stomach/intestine/bowel/eating/breathing/talking/singing/dancing/coordinated motion, facial/eye/mouth expression, and/or hand/arm/gesture/gait/UI/keystroke/typing stroke.

Type1/Type2 device may comprise heterogeneous IC, low-noise amplifier (LNA), power amplifier, transmit-receive switch, media access controller, baseband radio, and/or 2.4/3.65/4.9/5/6/sub-7/over-7/28/60/76 GHz/another radio. Heterogeneous IC may comprise processor/memory/software/firmware/instructions. It may support broadband/wireless/mobile/mesh/cellular network, WLAN/WAN/MAN, standard/IEEE/3GPP/WiFi/4G/LTE/5G/6G/7G/8G, IEEE 802.11/a/b/g/n/ac/ad/af/ah/ax/ay/az/be/bf/15/16, and/or Bluetooth/BLE/NFC/Zigbee/WiMax.

Processor may comprise any of: general-/special-/purpose/embedded/multi-core processor, microprocessor/microcontroller, multi-/parallel/CISC/RISC processor, CPU/GPU/DSP/ASIC/FPGA, and/or logic circuit. Memory may comprise non-/volatile, RAM/ROM/EPROM/EEPROM, hard disk/SSD, flash memory, CD-/DVD-ROM, magnetic/optical/organic/storage system/network, network/cloud/edge/local/external/internal storage, and/or any non-transitory storage medium. Set of instructions may comprise machine executable codes in hardware/IC/software/firmware, and may be embedded/pre-loaded/loaded upon-boot-up/on-the-fly/on-demand/pre-installed/installed/downloaded.

Processing/preprocessing/postprocessing may be applied to data (e.g. TSCI/feature/characteristics/STI/MI/test quantity/intermediate/data/analytics) and may have multiple steps. Step/pre-/post-/processing may comprise any of: computing function of operands/LOS/non-LOS/single-link/multi-link/component/item/quantity, magnitude/norm/phase/feature/energy/timebase/similarity/distance/characterization score/measure computation/extraction/correction/cleaning, linear/nonlinear/FIR/IIR/MA/AR/ARMA/Kalman/particle filtering, lowpass/bandpass/highpass/median/rank/quartile/percentile/mode/selective/adaptive filtering, interpolation/intrapolation/extrapolation/decimation/subsampling/upsampling/resampling, matched filtering/enhancement/restoration/denoising/smoothing/conditioning/spectral analysis/mean subtraction/removal, linear/nonlinear/inverse/frequency/time transform, Fourier transform (FT)/DTFT/DFT/FFT/wavelet/Laplace/Hilbert/Hadamard/trigonometric/sine/cosine/DCT/power-of-2/sparse/fast/frequency transform, zero/cyclic/padding, graph-based transform/processing, decomposition/orthogonal/non-orthogonal/over-complete projection/eigen-decomposition/SVD/PCA/ICA/compressive sensing, grouping/folding/sorting/comparison/soft/hard/thresholding/clipping, first/second/high order derivative/integration/convolution/multiplication/division/addition/subtraction, local/global/maximization/minimization, recursive/iterative/constrained/batch processing, least mean square/absolute error/deviation, cost function optimization, neural network/detection/recognition/classification/identification/estimation/labeling/association/tagging/mapping/remapping/training/clustering/machine/supervised/unsupervised/semi-supervised learning/network, vector/quantization/encryption/compression/matching pursuit/scrambling/coding/storing/retrieving/transmitting/receiving/time-domain/frequency- domain/normalization/scaling/expansion/representing/merging/combining/splitting/tracking/monitoring/shape/silhouette/motion/activity/analysis, pdf/histogram estimation/importance/Monte Carlo sampling, error detection/protection/correction, doing nothing, time-varying/adaptive processing, conditioning/weighted/averaging/over selected components/links, arithmetic/geometric/harmonic/trimmed mean/centroid/medoid computation, morphological/logical operation/permutation/combination/sorting/AND/OR/XOR/union/intersection, vector operation/addition/subtraction/multiplication/division, and/or another operation. Processing may be applied individually/jointly. Acceleration using GPU/DSP/coprocessor/multicore/multiprocessing may be applied.

Function may comprise: characteristics/feature/magnitude/phase/energy, scalar/vector/discrete/continuous/polynomial/exponential/logarithmic/trigonometric/transcendental/logical/piecewise/linear/algebraic/nonlinear/circular/piecewise linear/real/complex/vector- valued/inverse/absolute/indicator/limiting/floor/rounding/sign/composite/sliding/moving function, derivative/integration, function of function, one-to-one/one-to-many/many-to-one/many-to-many function, mean/mode/median/percentile/max/min/range/statistics/histogram, local/global max/min/zero-crossing, variance/variation/spread/dispersion/deviation/standard deviation/divergence/range/interquartile range/total variation/absolute/total deviation, arithmetic/geometric/harmonic/trimmed mean/square/cube/root/power, thresholding/clipping/rounding/truncation/quantization/approximation, time function processed with an operation (e.g. filtering), sine/cosine/tangent/cotangent/secant/cosecant/elliptical/parabolic/hyperbolic/game/zeta function, probabilistic/stochastic/random/ergodic/stationary/deterministic/periodic/repeated function, inverse/transformation/frequency/discrete time/Laplace/Hilbert/sine/cosine/triangular/wavelet/integer/power-of-2/sparse transform, orthogonal/non-orthogonal/eigen projection/decomposition/eigenvalue/singular value/PCA/ICA/SVD/compressive sensing, neural network, feature extraction, function of moving window of neighboring items of time series, filtering function/convolution, short-time/discrete transform/Fourier/cosine/sine/Hadamard/wavelet/sparse transform, matching pursuit, approximation, graph-based processing/transform/graph signal processing, classification/identification/class/group/category/labeling, processing/preprocessing/postprocessing, machine/learning/detection/estimation/feature extraction/learning network/feature extraction/denoising/signal enhancement/coding/encryption/mapping/vector quantization/remapping/lowpass/highpass/bandpass/matched/Kalman/particle/FIR/IIR/MA/AR/ARMA/median/mode/adaptive filtering, first/second/high order derivative/integration/zero crossing/smoothing, up/down/random/importance/Monte Carlo sampling/resampling/converting, interpolation/extrapolation, short/long term statistics/auto/cross correlation/moment generating function/time averaging/weighted averaging, special/Bessel/Beta/Gamma/Gaussian/Poisson/integral complementary error function.

Sliding time window may have time-varying width/size. It may be small/large at beginning to enable fast/accurate acquisition and increase/decrease over time to steady-state size comparable to motion frequency/period/transient motion duration/characteristics/STI/MI to be monitored. Window size/time shift between adjacent windows may be constant/adaptively/dynamically/automatically changed/adjusted/varied/modified (e.g. based on battery life/power consumption/available computing power/change in amount of targets/nature of motion to be monitored/user request/choice/instruction/command).

Characteristics/STI/MI may be determined based on characteristic value/point of function and/or associated argument of function (e.g. time/frequency). Function may be outcome of a regression. Characteristic value/point may comprise local/global/constrained/significant/first/second/i^th maximum/minimum/extremum/zero-crossing (e.g. with positive/negative time/frequency/argument) of function. Local signal-to-noise-ratio (SNR) or SNR-like parameter may be computed for each pair of adjacent local max (peak)/local min (valley) of function, which may be some function (e.g. linear/log/exponential/monotonic/power/polynomial) of fraction or difference of a quantity (e.g. power/magnitude) of local max over the quantity of local min. Local max (or min) may be significant if its SNR is greater than threshold and/or if its amplitude is greater (or smaller) than another threshold. Local max/min may be selected/identified/computed using persistence-based approach. Some significant local max/min may be selected based on selection criterion (e.g. quality criterion/condition, strongest/consistent significant peak in a range). Unselected significant peaks may be stored/monitored as "reserved" peaks for use in future selection in future sliding time windows. E.g. a particular peak (e.g. at particular argument/time/frequency) may appear consistently over time. Initially, it may be significant but not selected (as other peaks may be stronger). Later, it may become stronger/dominant consistently. When selected, it may be back-traced in time and selected in earlier time to replace previously selected peaks (momentarily strong/dominant but not persistent/consistent). Consistency of peak may be measured by trace, or duration of being significant. Alternatively, local max/min may be selected based on finite state machine (FSM). Decision thresholds may be time-varying, adjusted adaptively/dynamically (e.g. based on back-tracing timing/FSM, or data distribution/statistics).

A similarity score (SS)/component SS may be computed based on two temporally adjacent CI/CIC, of one TSCI or of two different TSCI. The pair may come from same/different sliding window (s). SS or component SS may comprise: time reversal resonating strength (TRRS), auto/cross correlation/covariance, inner product of two vectors, L1/L2/Lk/Euclidean/statistical/weighted/distance score/norm/metric/quality metric, signal quality condition, statistical characteristics, discrimination score, neural network/deep learning network/machine learning/training/discrimination/weighted averaging/preprocessing/denoising/signal conditioning/filtering/time correction/timing compensation/phase offset compensation/transformation/component-wise operation/feature extraction/FSM, and/or another score.

Any threshold may be fixed (e.g. 0, 0.5, 1, 1.5, 2), pre-determined and/or adaptively/dynamically determined (e.g. by FSM, or based on time/space/location/antenna/path/link/state/battery life/remaining battery life/available resource/power/computation power/network bandwidth). Threshold may be applied to test quantity to differentiate two events/conditions/situations/states, A and B. Data (e.g. CI/TSCI/feature/similarity score/test quantity/characteristics/STI/MI) may be collected under A/B in training situation. Test quantity (e.g. its distribution) computed based on data may be compared under A/B to choose threshold based on some criteria (e.g. maximum likelihood (ML), maximum aposterior probability (MAP), discriminative training, minimum Type1 (or 2) error for given Type 2 (or 1) error, quality criterion, signal quality condition). Threshold may be adjusted (e.g. to achieve different sensitivity), automatically/semi-automatically/manually/adaptively/dynamically, once/sometimes/often/periodically/repeatedly/occasionally/sporadically/on-demand (e.g. based on object/movement/location direction/action/characteristics/STI/MI/size/property/trait/habit/behavior/venue/feature/fixture/furniture/barrier/material/machine/living thing/thing/boundary/surface/medium/map/constraint/model/event/state/situation/condition/time/timing/duration/state/ history/u ser/preference). An iterative algorithm may stop after N iterations, after time-out period, or after test quantity satisfies a condition (e.g. updated quantity greater than threshold) which may be fixed/adaptively/dynamically adjusted.

Searching for local extremum may comprise constrained/minimization/maximization, statistical/dual/constraint/convex/global/local/combinatorial/infinite-dimensional/multi-objective/multi-modal/non-differentiable/particle-swarm/simulation-based optimization, linear/nonlinear/quadratic/higher-order regression, linear/nonlinear/stochastic/constraint/dynamic/mathematical/disjunctive/convex/semidefinite/conic/cone/interior/fractional/integer/sequential/quadratic programming, conjugate/gradient/subgradient/coordinate/reduced descent, Newton's/simplex/iterative/point/ellipsoid/quasi-Newton/interpolation/memetic/genetic/evolutionary/pattern-/gravitational-search method/algorithm, constraint satisfaction, calculus of variations, optimal control, space mapping, heuristics/meta-heuristics, numerical analysis, simultaneous perturbation stochastic approximation, stochastic tunneling, dynamic relaxation, hill climbing, simulated annealing, differential evolution, robust/line/Tabu/reactive search/optimization, curve fitting, least square, variational calculus, and/or variant. It may be associated with an objective/loss/cost/utility/fitness/energy function.

Regression may be performed using regression function to fit data, or function (e.g. ACF/transform/mapped) of data, in regression window. During iterations, length/location of regression window may be changed. Regression function may be linear/quadratic/cubic/polynomial/another function. Regression may minimize any of: mean/weighted/absolute/square deviation, error, aggregate/component/weighted/mean/sum/absolute/square/high-order/another error/cost (e.g. in projection domain/selected axes/orthogonal axes), robust error (e.g. first error (e.g. square) for smaller error magnitude, second error (e.g. absolute) for larger error magnitude), and/or weighted sum/mean of multiple errors (e.g. absolute/square error). Error associated with different links/path may have different weights (e.g. link with less noise may have higher weight). Regression parameter (e.g. time-offset associated with max/min regression error of regression function in regression window, location/width of window) may be initialized and/or updated during iterations (e.g. based on target value/range/profile, characteristics/STI/MI/test quantity, object motion/quantity/count/location/state, past/current trend, location/amount/distribution of local extremum in previous windows, carrier/subcarrier frequency/bandwidth of signal, amount of antennas associated with the channel, noise characteristics, histogram/distribution/central/F-distribution, and/or threshold). When converged, current time offset may be at center/left/right (or fixed relative location) of regression window.

In presentation, information may be displayed/presented (e.g. with venue map/environmental model). Information may comprise: current/past/corrected/approximate/map/location/speed/acceleration/zone/region/area/segmentation/coverage-area, direction/path/trace/history/traffic/summary, frequently-visited areas, customer/crowd event/distribution/behavior, crowd-control information, acceleration/speed/vital-sign/breathing/heart-rate/activity/emotion/sleep/state/rest information, motion-statistics/MI/STI, presence/absence of motion/people/pets/object/vital sign, gesture (e.g. hand/arm/foot/leg/body/head/face/mouth/eye)/meaning/control (control of devices using gesture), location-based gesture-control/motion-interpretation, identity/identifier (ID) (e.g. of object/person/user/pet/zone/region, device/machine/vehicle/drone/car/boat/bicycle/TV/air-con/fan/, self-guided machine/device/vehicle), environment/weather information, gesture/gesture control/motion trace, earthquake/explosion/storm/rain/fire/temperature, collision/impact/vibration, event/door/window/open/close/fall-down/accident/burning/freezing/water-/wind-/air-movement event, repeated/pseudo-periodic event (e.g. running on treadmill, jumping up/down, skipping rope, somersault), and/or vehicle event. Location may be one/two/three dimensional (e.g. expressed/represented as 1D/2D/3D rectangular/polar coordinates), relative (e.g. w.r.t. map/environmental model) or relational (e.g. at/near/distance-from a point, halfway between two points, around corner, upstairs, on table top, at ceiling, on floor, on sofa).

Information (e.g. location) may be marked/displayed with some symbol. Symbol may be time-varying/flashing/pulsating with changing color/intensity/size/orientation. Symbol may be a number reflecting instantaneous quantity (e.g. analytics/gesture/state/status/action/motion/breathing/heart rate, temperature/network traffic/connectivity/remaining power). Symbol/size/orientation/color/intensity/rate/characteristics of change may reflect respective motion. Information may be in text or presented visually/verbally (e.g. using pre-recorded voice/voice synthesis)/mechanically (e.g. animated gadget, movement of movable part).

User device may comprise smart phone/tablet/speaker/camera/display/TV/gadget/vehicle/appliance/device/IoT, device with UI/GUI/voice/audio/record/capture/sensor/playback/display/animation/VR/AR (augmented reality)/voice (assistance/recognition/synthesis) capability, and/or tablet/laptop/PC.

Map/floor plan/environmental model (e.g. of home/office/building/store/warehouse/facility) may be 2-/3-/higher-dimensional. It may change/evolve over time (e.g. rotate/zoom/move/jump on screen). Walls/windows/doors/entrances/exits/forbidden areas may be marked. It may comprise multiple layers (overlays). It may comprise maintenance map/model comprising water pipes/gas pipes/wiring/cabling/air ducts/crawl-space/ceiling/underground layout.

Venue may be segmented/subdivided/zoned/grouped into multiple zones/regions/sectors/sections/territories/districts/precincts/localities/neighborhoods/areas/stretches/expance such as bedroom/living/dining/rest/storage/utility/warehouse/conference/work/walkway/kitchen/foyer/garage/first/second floor/offices/reception room/area/regions. Segments/regions/areas may be presented in map/floor plan/model with presentation characteristic (e.g. brightness/intensity/luminance/color/chrominance/texture/animation/flashing/rate).

An example of disclosed system/apparatus/method. Stephen and family want to install disclosed wireless motion detection system to detect motion in their 2000 sqft two-storey town house in Seattle, Washington. Because his house has two storeys, Stephen decides to use one Type2 device (named A) and two Type1 devices (named B and C) in ground floor. His ground floor has three rooms: kitchen, dining and living rooms arranged in straight line, with dining room in middle. He put A in dining room, and B in kitchen and C in living room, partitioning ground floor into 3 zones (dining room, living room, kitchen). When motion is detected by AB pair and/or AC pair, system would analyze TSCI/feature/characteristics/STI/MI and associate motion with one of 3 zones.

When Stephen and family go camping in holiday, he uses mobile phone app (e.g. Android phone app or iPhone app) to turn on motion detection system. If system detects motion, warning signal is sent to Stephen (e.g. SMS, email, push message to mobile phone app). If Stephen pays monthly fee (e.g. $10/month), a service company (e.g. security company) will receive warning signal through wired (e.g. broadband)/wireless (e.g. WiFi/LTE/5G) network and perform security procedure (e.g. call Stephen to verify any problem, send someone to check on house, contact police on behalf of Stephen).

Stephen loves his aging mother and cares about her well-being when she is alone in house. When mother is alone in house while rest of family is out (e.g. work/shopping/vacation), Stephen turns on motion detection system using his mobile app to ensure mother is ok. He uses mobile app to monitor mother's movement in house. When Stephen uses mobile app to see that mother is moving around house among the three regions, according to her daily routine, Stephen knows that mother is ok. Stephen is thankful that motion detection system can help him monitor mother's well-being while he is away from house.

On typical day, mother would wake up at 7 am, cook her breakfast in kitchen for 20 minutes, eat breakfast in dining room for 30 minutes. Then she would do her daily exercise in living room, before sitting down on sofa in living room to watch favorite TV show. Motion detection system enables Stephen to see timing of movement in 3 regions of house. When motion agrees with daily routine, Stephen knows roughly that mother should be doing fine. But when motion pattern appears abnormal (e.g. no motion until 10 am, or in kitchen/motionless for too long), Stephen suspects something is wrong and would call mother to check on her. Stephen may even get someone (e.g. family member/neighbor/paid personnel/friend/social worker/service provider) to check on mother.

One day Stephen feels like repositioning a device. He simply unplugs it from original AC power plug and plugs it into another AC power plug. He is happy that motion detection system is plug-and-play and the repositioning does not affect operation of system. Upon powering up, it works right away.

Sometime later, Stephen decides to install a similar setup (i.e. one Type2 and two Type1 devices) in second floor to monitor bedrooms in second floor. Once again, he finds that system set up is extremely easy as he simply needs to plug Type2 device and Type1 devices into AC power plug in second floor. No special installation is needed. He can use same mobile app to monitor motion in both ground/second floors. Each Type2 device in ground/second floors can interact with all Type1 devices in both ground/second floors. Stephen has more than double capability with combined systems.

Disclosed system can be applied in many applications. Type1/Type2 devices may be any WiFi-enabled devices (e.g. smart IoT/appliance/TV/STB/speaker/refrigerator/stove/oven/microwave/fan/heater/air-con/router/phone/computer/tablet/accessory/plug/pipe/lamp/smoke detector/furniture/fixture/shelf/cabinet/door/window/lock/sofa/table/chair/piano/utensil/wearable/watch/tag/key/ticket/belt/wallet/pen/hat/necklace/implantable/phone/eyeglasses/glass panel/gaming device) at home/office/facility, on table, at ceiling, on floor, or at wall. They may be placed in conference room to count people. They may form a well-being monitoring system to monitor daily activities of older adults and detect any sign of symptoms (e.g. dementia, Alzheimer's disease). They may be used in baby monitors to monitor vital signs (breathing) of babies. They may be placed in bedrooms to monitor sleep quality and detect any sleep apnea. They may be placed in cars to monitor well-being of passengers and drivers, detect sleepy drivers or babies left in hot cars. They may be used in logistics to prevent human trafficking by monitoring any human hidden in trucks/containers. They may be deployed by emergency service at disaster area to search for trapped victims in debris. They may be deployed in security systems to detect intruders.

In some embodiments, the present disclosure discloses device-free or passive WiFi-based indoor tracking, which is favored for its user-friendliness, as it does not require a carried device. CSI-based fingerprinting may be used in tracking due to its ability to provide detailed and unique signal characteristics for precise position identification. Different aspects of CSI can be used for fingerprinting, including the amplitudes of each subcarrier, the square sum of CSI amplitudes, and inter-subcarrier phase differences. Due to the complexity and volume of these features, learning-based methods can be used for efficient analysis. But a practical use of learning-based tracking methods is limited because they often struggle with generalization across different environments and subjects, necessitating a large and frequently updated database to remain effective. Additionally, the significant computational resources and extensive labor required for data collection restrict their widespread deployment.

In some embodiments, to reduce dependence on large datasets and extensive training, a passive WiFi-based tracking system is disclosed to leverage a location-discriminative signature resilient to environmental changes and user variability. A proximity-based signature can be used to combine user-to-device distance and motion continuity extracted from multiple transceiver links. With only single-shot training, the disclosed system can accurately track user locations passively. Its architecture aligns naturally with real-world WiFi deployments, providing a practical, scalable, and training-efficient solution for indoor tracking.

In some embodiments, a novel passive proximity-based indoor tracking system is disclosed to achieve decent performance with minimal training data. The system needs only a single one-shot route training session by one user, and can adapt seamlessly to different users with varied walking speeds. Additionally, the overall system design is lightweight, facilitating easier implementation and scalability.

FIG. 1 illustrates an example framework of a system 100 for wireless tracking, according to some embodiments of the present disclosure. As shown in FIG. 1, the system 100 may collect CSI streams 111 based on wireless signals transmitted from one or more IoT devices 102-1, 102-2, 102-3 (collectively 102) to a router 104. In general, the CSI 111 may be any channel information (e.g. CSI, CFR, CIR, etc.) collected based on wireless signals transmitted from a transmitter to a receiver. In some embodiments, the transmitter may serve as a Bot (e.g. Type1 device), while the receiver may serve as an Origin (e.g. Type2 device). A Bot can transmit a wireless signal to the Origin in a venue 108 (e.g. a house), to obtain channel information of a wireless multipath channel based on the wireless signal, where the channel information of the wireless multipath channel may be impacted by motion/presence of any object/user in the venue 108.

As shown in FIG. 1, the system 100 comprises two modules, location signature extraction and trajectory estimation. While the trajectory estimation module operates only during an online phase, the location signature extraction module can operate in both offline and online phases. In some embodiments, the location signature extraction includes a preprocessing module 110 and a feature extraction module 120. In some embodiments, the trajectory estimation includes a position estimator 130 and a trajectory refinement module 140.

In some embodiments, the preprocessing module 110 may process the CSI 111 to generate processed CSI. For example, the preprocessing module 110 may apply median filtering and normalization to reduce noise and outlier, to ensure consistent CSI across links for metric extraction. Each link may correspond to a connection between a transmitter and a receiver, or a connection between a transmitting antenna and a receiving antenna.

In the example shown in FIG. 1, the feature extraction module 120 can perform link-level feature extraction. For example, the feature extraction module 120 may extract three features on each Transmitter (TX)-Receiver (RX) link: proximity metric (PM), motion statistics (MS), and spatial feature.

In some examples, the proximity metric measures the user's distance to the device, and may be extracted based on the correlation of CSI amplitudes across subcarriers in frequency domain, which reflects relative nearness to devices and remains robust across users and environments. Each TX-RX link can yield a value that increases when the user is nearby and approaches zero when far. With multiple deployed pairs, the concatenated metrics form a unique spatial signature at each location.

In some examples, the motion statistics quantifies motion intensity and may be derived from the temporal autocorrelation of CSI amplitudes. The motion statistics can capture the movement continuity, which remains near zero in static periods and rises during motion. By indicating the presence and continuity of motion, the motion statistic further enhances the robustness of the overall location signature.

In some examples, the spatial feature may be derived based on principal component analysis (PCA) components from concatenated CSI across all antenna pairs, to represent location related characteristics of the object.

The proximity metric, the motion statistics and the spatial features extracted from each link can all be aggregated by concatenating the individual features into a unified multi-dimensional feature vector. This resulting vector may serve as a location signature, capturing both spatial and temporal characteristics of the user's position and movement. During an offline phase of the system, the location signature is generated based on a tester's movement in the venue 108 and may be stored in a signature database 125 for online use. During an online phase of the system, the location signature is generated based on a user's movement, and will be utilized by the trajectory estimation module to tracking the user's movement.

During the online inference phase, the position estimator 130 may compute the user's position signature by processing live CSI data. This signature is then compared against the pre-built signature database 125 of location signatures to estimate the user's current position.

Figure 2:
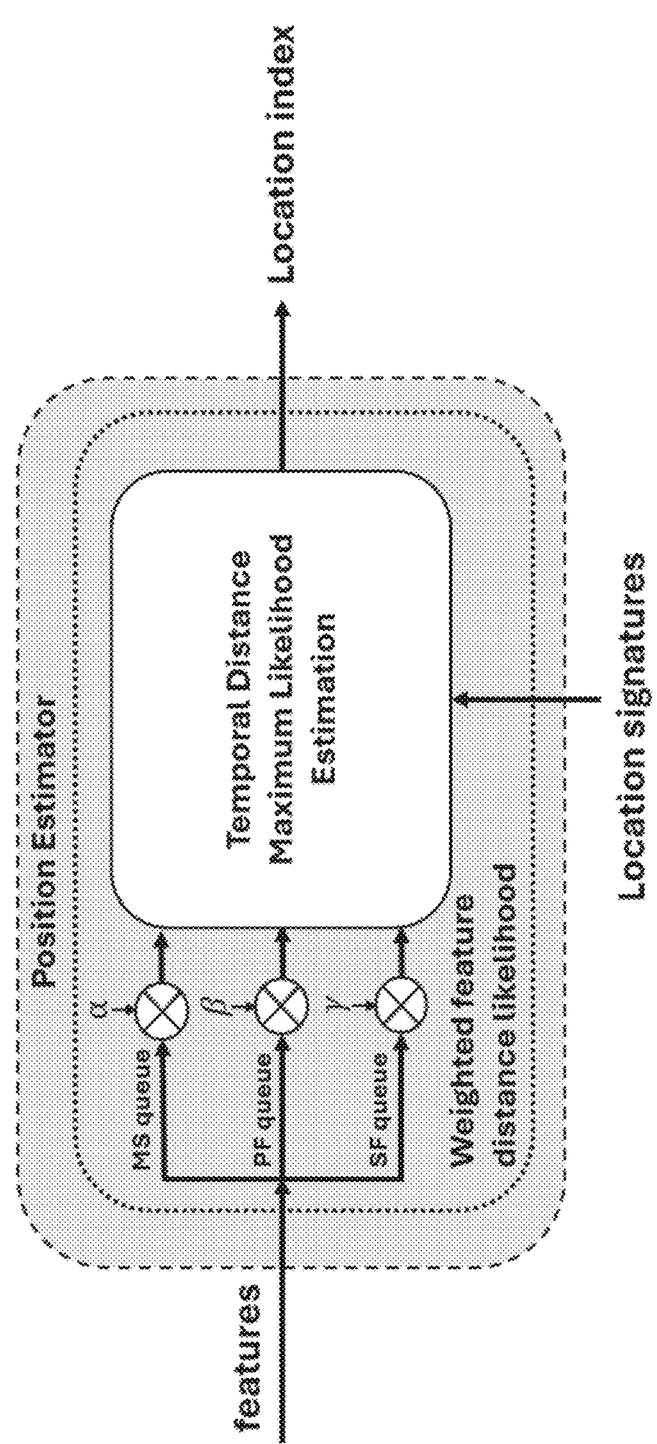
FIG. 2 illustrates an example position estimator in a system for wireless tracking, according to some embodiments of the present disclosure.

FIG. 2 illustrates an example position estimator 200 in a system for wireless tracking, according to some embodiments of the present disclosure. In some embodiments, the position estimator 200 may be implemented as the position estimator 130 in the system 100. As shown in FIG. 2, the motion statistics (MS) features, the proximity metric features, and the spatial features extracted per link can be combined with different weights, $\alpha$, $\beta$, $\gamma$, respectively, to generate a weighted feature combination. The weights are tunable based on user feedback and system performance. The position estimator 200 may perform a temporal distance maximum likelihood estimation based on the weighted feature combination generated online and the location signatures generated and stored offline. For example, the weighted feature combination may be compared with the location signatures to generate a weighted feature distance likelihood, which can be used to estimate a location index on a signature map of the venue 108. Each location on the signature map corresponds to a location in the venue 108, and the location index indicates a corresponding location on the signature map. By tracking a location of the user at each time stamp, the user's trajectory may be obtained over time.

In some embodiments, relying solely on signature matching can result in erratic jumps between non-adjacent locations due to noise and transient fluctuations. To enhance tracking accuracy, the trajectory refinement module 140 may be used to enforce spatial continuity by selecting the most probable path over a sliding time window. This can be achieved using a maximum likelihood approach, which smooths the trajectory and ensures more reliable position estimates.

Figure 3:
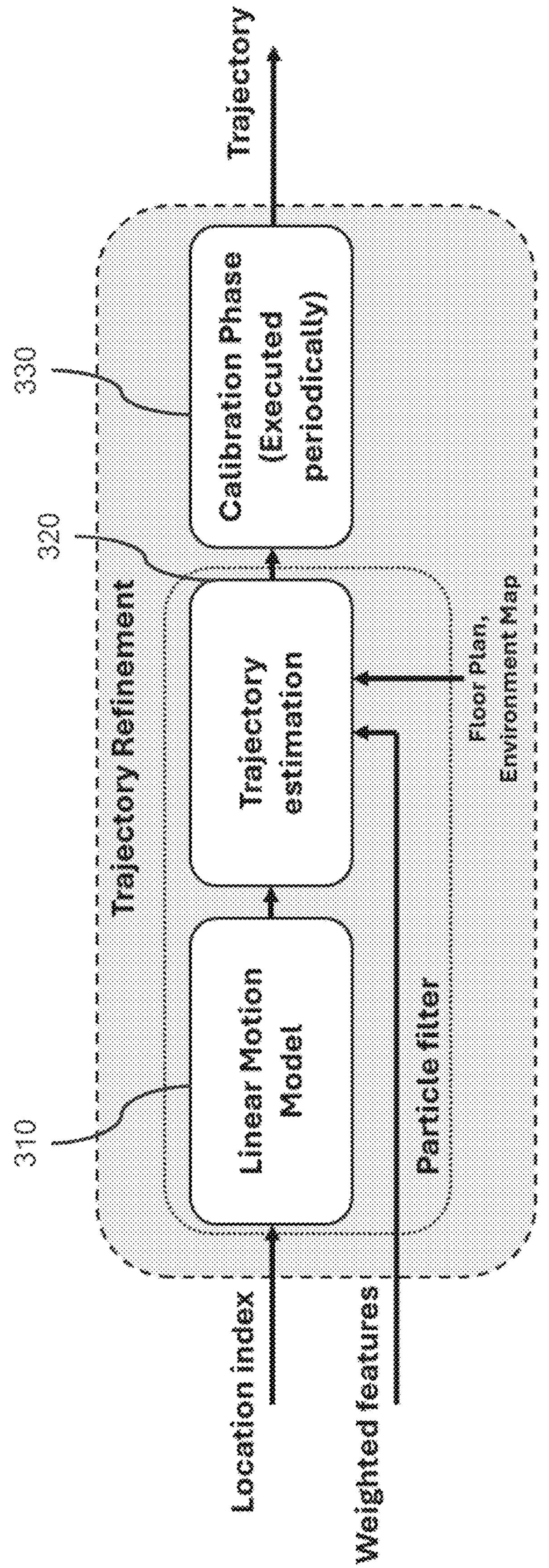
FIG. 3 illustrates an example trajectory refinement module in a system for wireless tracking, according to some embodiments of the present disclosure.

FIG. 3 illustrates an example trajectory refinement module 300 in a system for wireless tracking, according to some embodiments of the present disclosure. In some embodiments, the trajectory refinement module 300 may be implemented as the trajectory refinement module 140 in the system 100. As shown in FIG. 3, the trajectory refinement module 300 includes a linear motion model 310, a trajectory estimation module 320 and a calibration phase executor 330.

In some embodiments, the linear motion model 310 receives a location index, which may be an initial location index generated by the position estimator 200 or the position estimator 130, for each time stamp by a current time stamp in a time window. The linear motion model 310 can fit the initial location indices over time to generate a refined location index for the current time stamp based on an assumption of a continuous moving path of the object in the venue 108. The trajectory estimation module 320 may then generate the updated location index for the current time stamp based on: the refined location index, the weighted feature combination generated by the position estimator 200 or the position estimator 130, and one or more floor plan constraints or environment map associated with the venue 108. As such, the linear motion model 310 and the trajectory estimation module 320 form a particle filter to refines the tracking results, reducing the likelihood of sudden, unrealistic changes in estimated locations and enhancing overall tracking accuracy.

In some embodiments, the calibration phase executor 330 may perform a calibration periodically or upon a detected event. For example, the calibration phase executor 330 may determine that the object or user stops at a same location for longer than a predetermined time period based on the updated location index over the time window. This may indicate that the updated location index generated by the particle filter is not reliable at this time. Then, the calibration phase executor 330 may determine that the object is in close proximity to a device (e.g. the IoT devices 102, the router 104) for the current time stamp, with a confidence level higher than a predetermined threshold. At this point, the calibration phase executor 330 is more confident about the object's location in close proximity to the device, than the location generated by the particle filter. As such, the calibration phase executor 330 may perform a calibration or re-calibration to generate a calibrated location index for the current time stamp based on the close proximity and the confidence level, and replace the updated location index with the calibrated location index for the current time stamp.

Combining all location indices (updated or calibrated) for all time stamps, a trajectory 150 of the moving object or user can be obtained.

Figure 4:
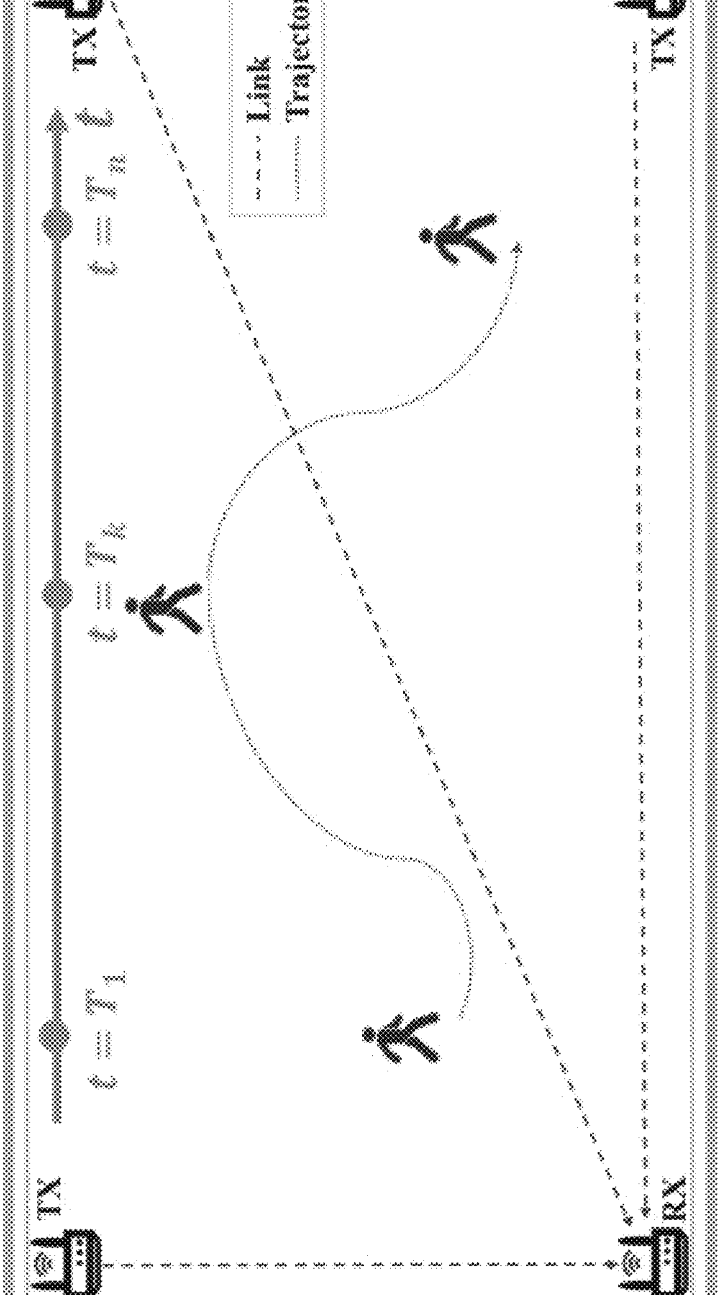
FIG. 4 illustrates a scenario of indoor tracking based on wireless signals, according to some embodiments of the present disclosure.

In some embodiments, the system may employ a single RX and multiple TXs, strategically positioned throughout the indoor space to ensure comprehensive coverage across designated areas and enrich the data with diverse characteristics for more robust tracking. FIG. 4 illustrates a scenario 400 of indoor tracking based on wireless signals, according to some embodiments of the present disclosure.

There are some main challenges of passive WiFi-based indoor tracking systems. First, CSI measurements are extremely sensitive to environmental dynamics. Consequently, the features directly extracted from CSI in the fingerprint database must be updated frequently. For instance, changes such as relocating furniture or altering the state of doors can significantly impact CSI measurements. In addition, variations in body size or walking patterns may also result in distinct CSI measurements. These changes can alter the signal characteristics captured in the fingerprint, leading to potential mismatches and inaccuracies. Second, CSI fingerprint-based systems face significant scalability challenges when applied to a large number of different buildings. This necessitates extensive data collection and calibration for each new building, making the process time-consuming and resource-intensive. Third, the lack of path flexibility in existing systems is a major limitation. These approaches typically require users to follow predefined paths to maintain accuracy, which heavily restricts their movements. Such restriction is not piratical as the user path is not predictable.

As discussed above, to tackle these challenges, one can resort to a statistical proximity metric derived from CSI. This metric serves as a location-specific signature that effectively captures the distance between a human and a device. Different from the features directly extracted from raw CSI, the proximity metric is fundamentally based on radio propagation principles, taking into account the influence of moving individuals on the signal. Consequently, it can precisely capture the movements of these individuals while remaining unaffected by static objects in the environment. This specificity ensures the metric's robustness and adaptability across diverse settings.

Figure 5:
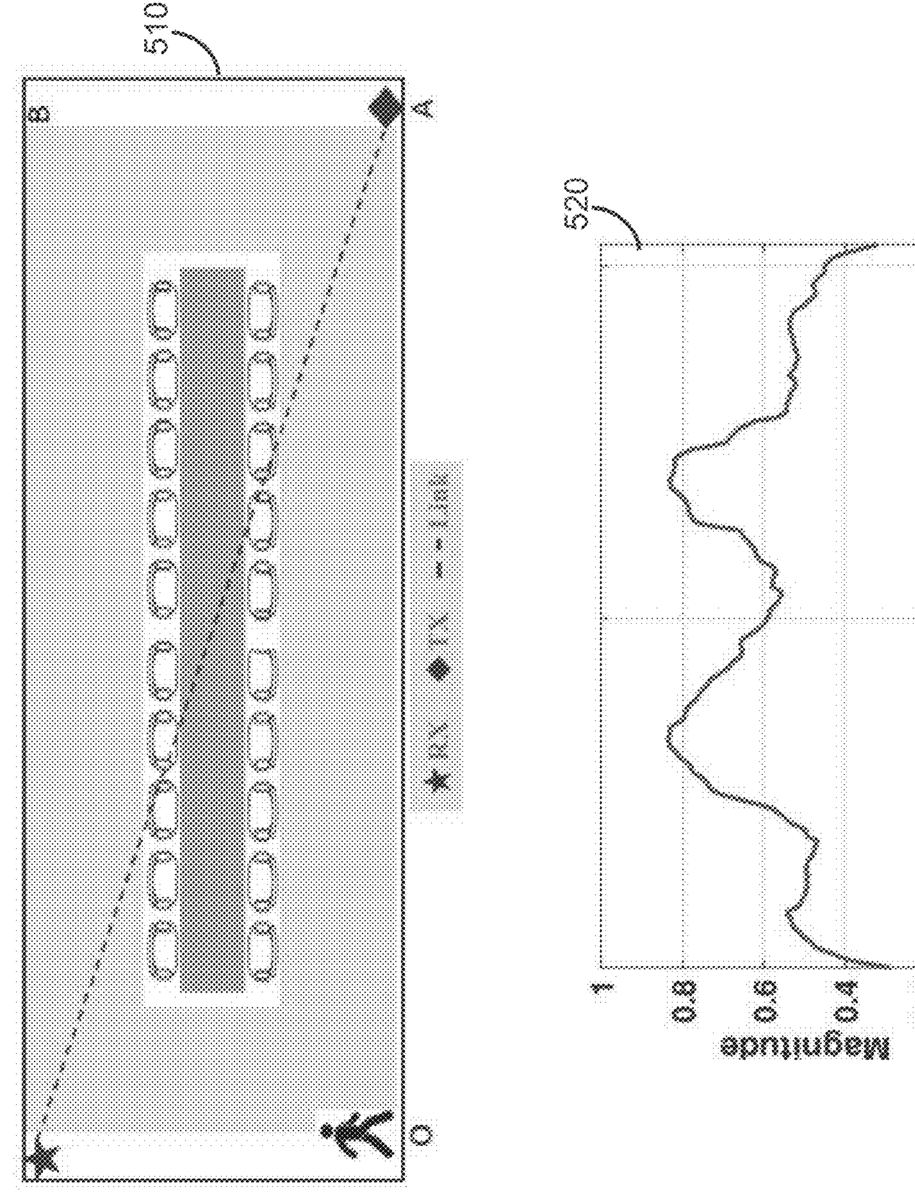
FIG. 5 illustrates an example walking scenario and corresponding proximity metrics, according to some embodiments of the present disclosure.
Figure 5:
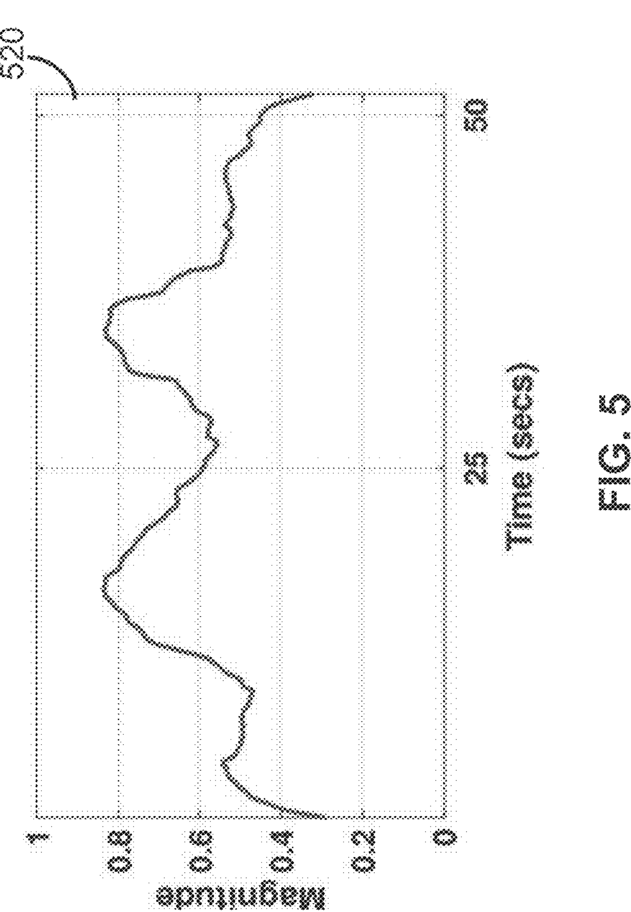

Based on the CSI propagation model, a moving human can be considered as a virtual transmitter. As this virtual transmitter approaches RX, the LOS signal between the virtual antenna and the RX becomes the dominant component of the propagation, with its power increasing while the power of the NLOS components rapidly decays. The dominance of the LOS components results in an increased space-frequency correlation, which measures the correlation of power responses across subcarriers. Conversely, as the virtual transmitter moves away from the RX, the primary LOS component's influence diminishes due to amplitude attenuation. Meanwhile, the amplitudes of the reflected and scattered signals relative to the direct path increase, which in turn leads to a decrease in space-frequency correlation. Therefore, the value of the correlation of power response of subcarriers can be utilized to indicate the distance between the moving human and the RX. FIG. 5 depicts a scenario 510 where a tester walks from point O to A, then to B, returns to A, and finally back to O. It can be observed that the proximity metric 520 depicted in FIG. 5 increases as the tester approaches A and decreases as the tester moves away.

Although the proximity metric can indicate whether a human is moving closer to or farther from the RX, it is unable to determine the specific location because it only assesses proximity, not precise positioning. To address this limitation, one can deploy multiple devices throughout the environment to ensure comprehensive coverage. Each device-pair contributes its own proximity metric. By aggregating these metrics, the system can synthesize a robust location signature that more accurately represents the spatial dynamics within the area. This integrated approach enhances the system's ability to pinpoint exact locations based on collective proximity metrics, offering a more detailed and accurate spatial analysis.

Figure 6:
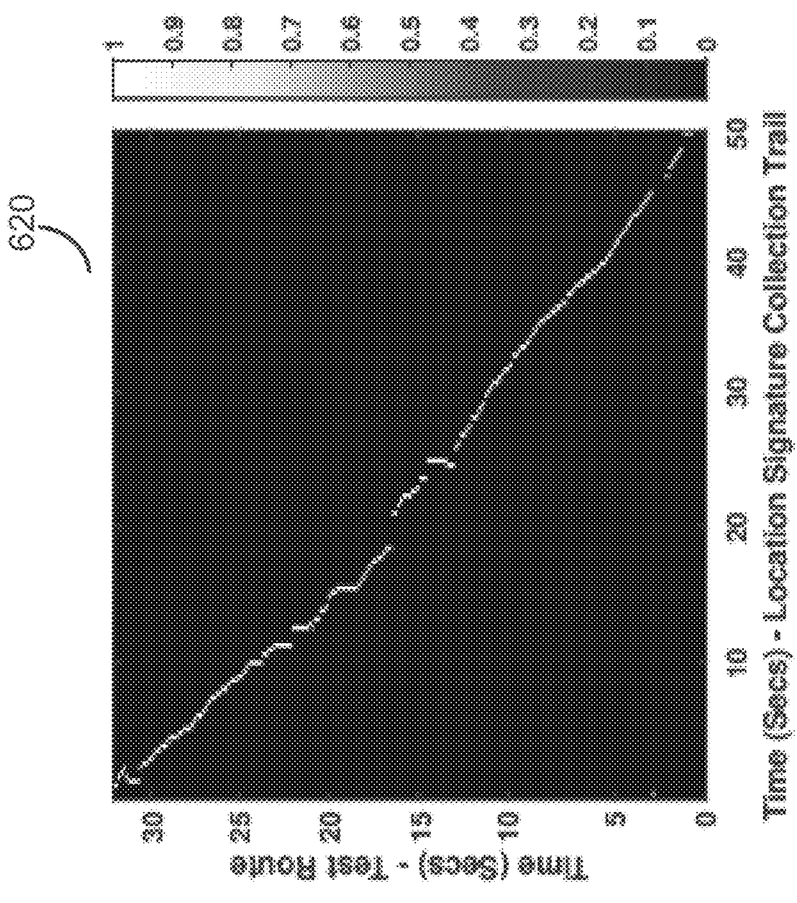
FIG. 6 illustrates an example floor plan and corresponding location signature matching overtime, according to some embodiments of the present disclosure.
Figure 6:
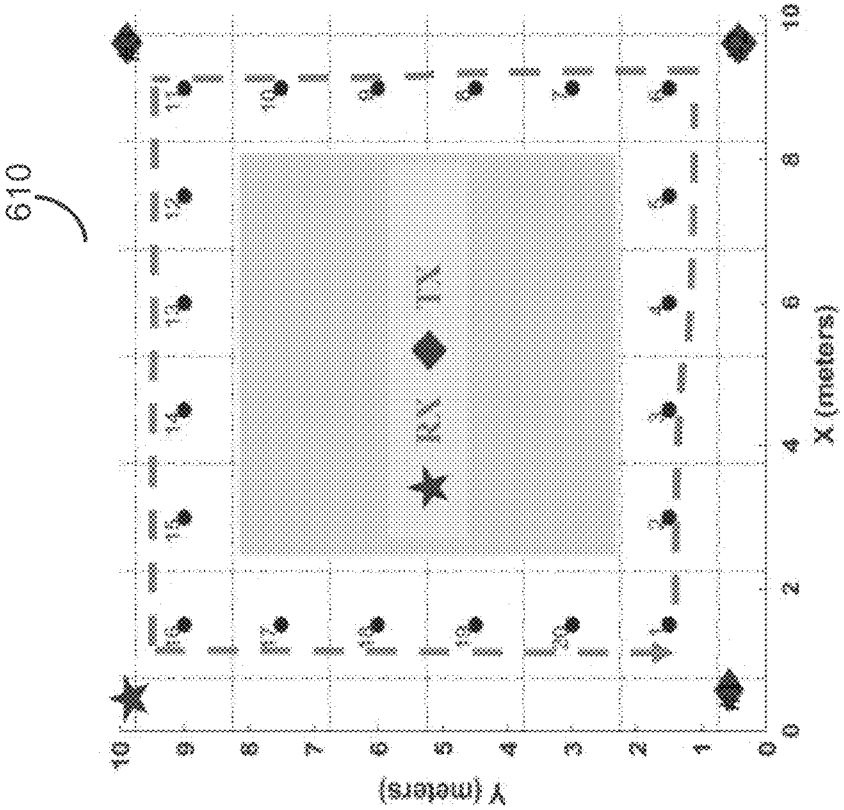

One can conduct experiments to verify the concept. FIG. 6 illustrates an example floor plan 610 and corresponding location signature matching over time, according to some embodiments of the present disclosure. As a person approaches or moves away from a device, e.g. in a room having the floor plan 610, the proximity metrics from all three TX-RX pairs dynamically capture location changes. To demonstrate its effectiveness, one can conduct a reversed, counterclockwise test route with a different tester at an increased speed of 1 m/s. The observation vector from each timestamp of the test route can be correlated with the location signature to identify the time index with the highest correlation. These points were then highlighted on a heatmap 620, illustrated in FIG. 6. The results clearly show that the collective proximity metrics from multiple TX-RX pairs effectively reflect the motion location within a room, enabling accurate tracking of a person. Additionally, because the feature effectively characterizes motion and is insensitive to static subjects and environments, the system can significantly reduce the training overhead required by most existing methods.

Figure 7:
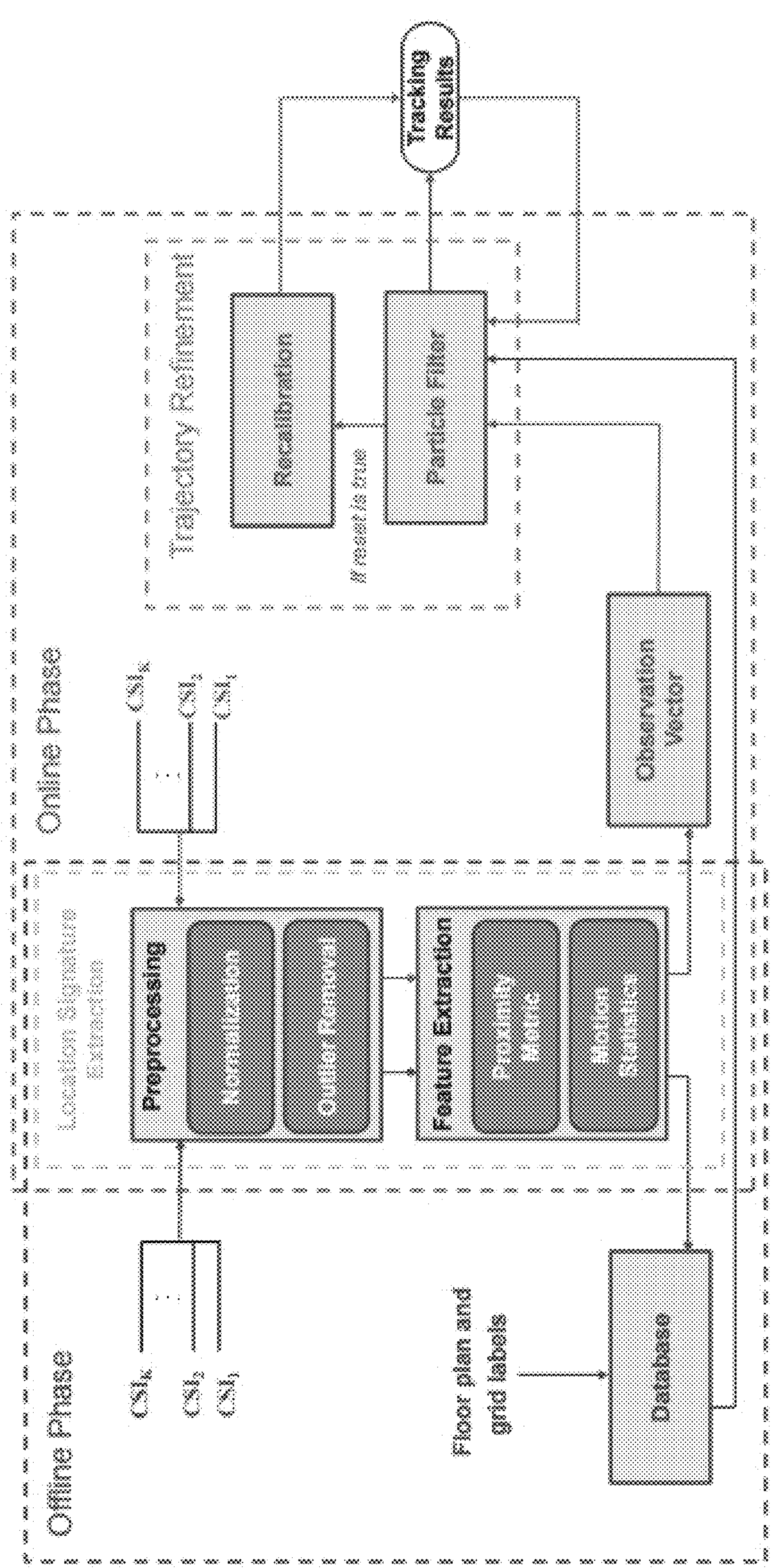
FIG. 7 illustrates an overview of a system for wireless tracking, according to some embodiments of the present disclosure.

FIG. 7 illustrates an overview of a system 700 for wireless tracking, according to some embodiments of the present disclosure. As discussed similarly to the system 100, the system 700 operates in two phases: offline and online. In both phases, the location signature extraction module first preprocesses CSI streams from all transceiver pairs through normalization and outlier removal. It then extracts the motion-related features to build location signature from the preprocessed CSI. In the offline phase, these signatures are labeled with corresponding locations/grids to form the signature database. In the online phase, the signature database and the floor plan are utilized in the trajectory refinement module, which includes a particle filter and a recalibration module, to enhance tracking accuracy.

In some examples, the location signature creation process involves CSI preprocessing and feature extraction. The system 700 can preprocess the CSI power response, i.e., $G(t,f)=|H(t,f)|^2$. The normalized power response of the $i^{th}$ subcarrier of the $k^{th}$ TX-RX pair, denoted as $\overline{G}_k(t, f_i)$), is expressed as $$\overline{G}_k(t, f_i) = \frac{G_k(t, fi)}{\sqrt{\sum_{j=1}^{N_s} |G_k(t, f_j)|^2}}$$

where $N_s$ is the number of subcarriers.

In some examples, the proximity metric of the $k^{th}$ TX-RX pair can be computed as $$\Theta_k = \frac{1}{N_s - 1} \sum_{i=1}^{N_s - 1} r_k(f_i, f_{i+1}),$$

-continued $$r_k(f_i, f_{i+1}) = \frac{COV\{\overline{G}_k(t, f_i), \overline{G}_k(t, f_{i+1})\}}{\sqrt{\text{var}\{\overline{G}_k(t, f_i)}\sqrt{\text{var}\{\overline{G}_k(t, f_{i+1})\}}},$$

where $r_k(f_i, f_{i+1})$ is the correlation coefficient between the CSI power response of the $i^{th}$ and the $i+1^{th}$ subcarrier for the $k^{th}$ TX-RX pair.

Although the collective proximity metrics from all pairs can effectively characterize motion location, the distinctiveness of these measurements can sometimes be compromised by noise and external interference. In some examples, the system 700 can further refine the location signature by integrating an additional statistical feature, motion statistics, based on a statistical Electromagnetic model that accounts for all multipath components indoors. The motion statistics for the $i^{th}$ subcarrier for the $k^{th}$ TX-RX pair is derived from the ACF of the CSI power response at a time lag $\tau=1/F_s$, with $F_s$ being the sounding rate. That is, $$\Phi_k(f_i) = \rho_k\left(\tau = \frac{1}{F_s}, f_i\right),$$

$$\rho_k(\tau, f_i) = \frac{COV\{\overline{G}_k + k(t, f_i), \overline{G}_k(t+\tau, f_{i+1})\}}{\sqrt{\text{var}\{\overline{G}_k(t, f_i)}\sqrt{\text{var}\{\overline{G}_k(t+\tau, f_i)\}}},$$

where COV and var are the operator of covariance and variance respectively, and $\rho_k(\tau, f_i)$ is the ACF of the power response of the $i^{th}$ subcarrier for $k^{th}$ TX-RX pair.

In some examples, in the absence of motion, $\Phi(f_i)$ is approximately zero, while $\Phi(f_i)>0$ when motion is present. Moreover, the magnitude of $\Phi(f_i)>0$ can also serve as an indicator of the motion's proximity to the device, reflecting the variation in motion values across different locations within the environment. This variation helps to pinpoint the motion's specific location relative to the device.

In some examples, the overall time-domain motion statistics $\Phi_j$ of the $j^{th}$ TX-RX pair can be defined by averaging across all subcarriers, smoothing transient noise and minor variations to provide a more consistent indicator of sustained motion within the environment.

For each grid, the system 700 can compile a set of location signature by aggregating both proximity metrics and motion statistics from all TX-RX pairs. This set is designed to encompass at least two stride patterns within the grid, enhancing the diversity and robustness of the location signature captured. Specifically, for a setup with K TX-RX pairs, the location signature of the $i_{th}$ grid, $\mathcal{F}_i$th, are as $$\mathcal{F}_{i^{th}} = \left\{ \begin{matrix} [\Phi_{1,1}, \ldots, \Phi_{K,1}, \Theta_{1,1}, \ldots, \Theta_{K,1}]_{i'} \\ \vdots \\ [\Phi_{1,M}, \ldots, \Phi_{K,M}, \Theta_{1,M}, \ldots, \Theta_{K,M}]_i \end{matrix} \right\},$$

where M is the number of the fingerprints for the $i^{th}$ grid.

The motion statistics and the proximity metric can capture the user's movement along the route. Each TX-RX pair effectively indicates whether the user is approaching or moving away. Collectively, these pairs construct a location-specific signature that accurately reflects user movement.

In some examples, during the offline phase, these vectors are used to build a database of labeled signatures for all predetermined grids. In the online phase, the feature vectors (observation vectors) serve as the input to the trajectory refinement module for tracking.

In some embodiments, using only location signatures for position tracking can lead to erratic estimation jumps due to noise and other disturbances, which is not consistent with the expected continuous movement of individuals across adjacent grids. As a tester walks clockwise along the perimeter of the room, the estimated positions over time may be marked on the floor plan. There are abrupt jumps in the tracking results. This example highlights the erratic nature of the tracking results, where the estimated positions suddenly jump to non-adjacent grid points, illustrating a significant challenge in maintaining a smooth trajectory estimation. Therefore, to address these inaccuracies and ensure a more realistic tracking of human motion, the system 700 incorporate a particle filter. This filter employs a motion model that reflects the natural progression through adjacent grids and utilizes the floor plan to determine accessible areas. By integrating these elements, the particle filter refines the tracking results, reducing the likelihood of sudden, unrealistic changes in estimated locations and enhancing overall tracking accuracy.

In some examples, the particle filter performs particle initialization, by distributing N particles within the grid point where the location signature most closely matches the observation vector when the person begins walking. Using a motion model, the position of the $i^{th}$ particle at time t, $$(x_t^i, y_t^i)$$

is updated as follows $$x_t^i = x_{t-1}^i + (l_t + \delta^i)\cos(\eta_t^i)$$
$$y_t^i = y_{t-1}^i + (l_t + \delta^i)\sin(\eta_t^i),$$

where $\delta^i$ and $l_t$ is Gaussian random noise and the step size receptively.

$$\eta_t^i$$

denotes the direction of the $i^{th}$ particle. The system 700 can restrict $$\eta_t^i$$

to one of four directions to facilitate efficient computation and robust tracking. Any updated particle that hits a wall or obstacle will be eliminated.

In some examples, the particle filter performs particle weighting, where particle weights are updated by calculating the minimum distance between each particle's location signature and the observation vector. For example, if the $i^{th}$ particle is in grid j at time t, the weight can be computed as $$w_t^i = \frac{e^{-d_i^2/2}}{\sum_k e^{-d_k^2/2}},$$

-continued $$d_i^2 = \min_{k\in M} \sum_i^K (\hat{\Phi}_{i,k} - \Phi_{i,k})^2 + (\hat{\Theta}_{i,k} - \theta_{i,k})^2$$

where $d_i$ is the minimum weighted distance between the observation, i.e., $\hat{\Phi}$ and $\hat{\Theta}$ and the observation vector for grid j.

In some examples, the particle filter performs resampling and position update, by using the classical sequential importance resampling approach to update the current particles, regenerating eliminated particles to prevent over-concentration. Next, the weighted positions of the particles are calculated and output as the estimated position.

During the particle weighting process, the system 700 employs a temporal window to record the minimum distance between the location signature of each particle and the observation vector. This approach is strategically designed to effectively reduce displacement errors that might accumulate over time due to inaccuracies inherent in the motion model of the particle filter. In some examples, accumulated errors can be caused by the motion model. Starting at a time stamp, the estimated grid indices fluctuate between e.g. 9 and 11. This oscillation in the estimated positions can be attributed to the particle motion model within the tracking system.

In some embodiments, recalibration is utilized to manage these errors effectively by employing a temporal window that compares the current observation feature vector with the location signature. If they closely match, it strongly suggests that the current position is accurately represented by this grid. Consequently, the system can recalibrate by resetting the particles to this specific grid, enhancing the tracking accuracy and preventing the propagation of previous errors. Specifically, if the average minimum distance across this window exceeds a predefined threshold, it triggers a recalibration of the estimated position. In such cases, the estimated position is reset to the grid point where the minimum distance between the location signature of any particle and the observation vector is the smallest. This method ensures greater accuracy in position estimation by adapting to significant discrepancies that might arise due to noise or other factors affecting the measurements.

Figure 8:
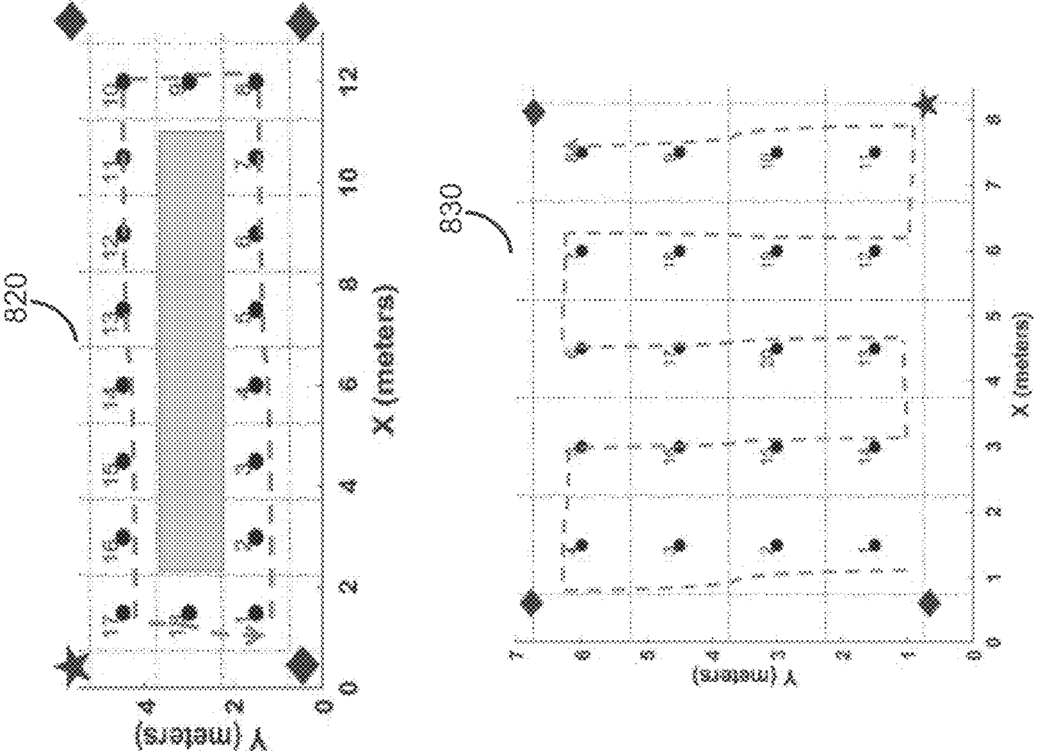
FIG. 8 illustrates example floor plans of various scenarios, according to some embodiments of the present disclosure.
Figure 8:
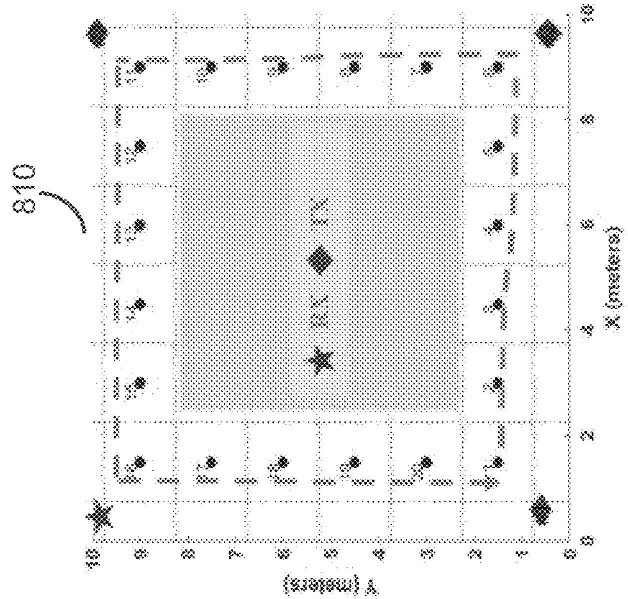

Various experiments can be performed to assess the performance of the disclosed system. In some examples, the disclosed system may be evaluated using commodity WiFi devices, serving as TX and RX. For example, the system can be operated at carrier frequency 5.18 GHz with a sounding rate of 30 Hz and a bandwidth of 40 MHz with 58 subcarriers. In some examples, experiments can be conducted in three different indoor environments, each with varying dimensions and featuring various appliances and furnishings. For example, the dimensions of the scenarios are 10.6 m×9.8 m, 14 m×5 m, and 7.1 m×8.2 m, respectively. In each scenario, four devices (1 RX and 3 TXs) are positioned at room corners at standard desk height (0.6 m to 1.2 m). FIG. 8 shows the floor plans 810, 820, 830 of the three rooms. Each room may be divided into 1.5 m×1.5 m grids, a size selected to match approximately 2 normal walking strides, ensuring that the features captured are diverse enough to accurately represent each location. Scenarios 810, 820 feature typical meeting rooms with movement restricted to the perimeter, illustrating common spatial constraints. In contrast, scenario 830 shows an empty room allowing unrestricted movement, making it ideal for evaluating complex navigation patterns, including zigzag movements.

During the location signature collection trails, one can collect data from a tester who is instructed to walk continuously at his/her normal walking pace following a predetermined route marked dashed lines. In some examples, the offline location signature trails can be conducted only once for each scenario.

Various metrics can be used to evaluate the system, e.g. Grid Localization Accuracy (GLA), defined as the ratio of correctly estimated testing cells to the total number of cell locations during the estimation phase, or Median Distance Error (MDE), which is the average distance between the center points of the estimated and actual grids. The results can show that the system performs well in terms of both metrics, even with the limited training resources of a single-shot location signature trial. This high performance highlights the effectiveness of the disclosed method's reliable proximity-based signature approach. Further, the results show that the disclosed system does not have specific bandwidth requirements. This is due to a fact that the utilized features primarily rely on the dominant LOS signal between the moving human and the RX. Since the LOS signal is less susceptible to multipath interference, the performance of the system is largely unaffected by bandwidth variations. In addition, the results can demonstrate that utilizing a combination of features (e.g. proximity metric, motion statistics, spatial feature) significantly enhances performance compared to using a single feature. This improvement is attributed to the increased distinctiveness of the location signature set.

As discussed above, a passive proximity-based indoor tracking system is disclosed to leverage advanced statistical techniques to enhance location accuracy. In some embodiments, the system lies in the use of proximity metrics combined with motion statistics through multiple TX-RX pairs, which together form a robust location signature feature set. This integration not only captures the distance level between the tracked individual and the receiver but also accounts for the dynamic nature of human movement. The system also incorporates a particle filter, which is vital for smoothing tracking trajectories. This filter uses temporal dependencies to ensure movement continuity and integrates floor plan constraints to correct drifts and errors from motion modeling and environmental fluctuations. Extensive experiments in various real-world scenarios have demonstrated the system's capability to maintain high accuracy and reliability, making it a promising solution for indoor tracking applications.

In some embodiments, the disclosed framework leverages environment-independent, model-based features across multiple domains (time, frequency, and space) to construct location signatures derived from Wi-Fi channel state information (CSI) from N devices distributed in the environment, enabling the tracking of users without any carried devices in indoor environments. Unlike traditional deep learning or machine learning approaches that directly train on raw CSI data for feature learning, the disclosed system leverages theoretically grounded features. This design significantly can reduce the training overhead and eliminate the need for a large, diverse dataset collected from multiple users with varying body sizes and walking patterns.

In some embodiments, the system employs a weighted distance-metric maximum-likelihood estimation process that aggregates likelihood information over a temporal window rather than a single observation, enabling more consistent and reliable association between user observations and stored location signatures for initial position estimation. The system also introduces a particle filter-based refinement approach designed to incorporate floor plan constraints and motion continuity, effectively mitigating abrupt and unrealistic position jumps to enhance the accuracy and smoothness of human motion trajectory estimation. The fusion of these model-based features enables the construction of environment-robust and discriminative location signatures from multiple distributed devices. The system performs weighted distance-metric maximum likelihood estimation for user-signature association. The system performs particle filter-based refinement integrating floor plan constraints and motion continuity.

In some embodiments, one can replace Wi-Fi CSI sensing with other wireless or non-radio modalities such as UWB, Bluetooth RSSI, infrared, acoustic, or vision-based sensing to generate spatial or motion-related signatures. Even within the Wi-Fi CSI domain, a system could derive different types of features that do not rely on the multi-domain model-based representation (spanning the time, frequency, and spatial domains, which correspond respectively to motion statistics, proximity features, and PCA-derived components from concatenated CSI across all antenna pairs). In some embodiments, the system could extract features only from one domain (e.g., temporal or spatial) or apply different aggregation schemes such as local per-device processing or centralized raw-data fusion, instead of multi-domain model-based fusion. In some embodiments, the weighted distance-metric maximum-likelihood estimation may be replaced with other matching or probabilistic approaches, such as k-nearest neighbor (k-NN) fingerprinting, Bayesian inference, neural regression, or graph-based matching, e.g. using Kalman filtering, trajectory optimization, or map-matching instead of a particle filter combined with floor plan and motion-continuity constraints. In some embodiments, a system can represent location information through alternative signatures, e.g., dynamic spectrograms, statistical channel features, or time-frequency templates rather than the model-based location signatures.

In some embodiments, while the system does not strictly require knowing the exact locations of the Wi-Fi devices, having this information is beneficial for the calibration phase. If devices are moved, the model may be retrained. However, if only some devices are moved, the system can still provide reasonable performance using the location signatures from the remaining, stationary devices, provided they still offer good environmental coverage.

In some embodiments, the system primarily focuses on human walking. But in other embodiments, it can be applied to tracking objects like a dog, a cat, or a robot, provided the movement generates a specific pattern. The concept can be applied to multiple people or multiple objects. Additionally, if furniture is moved in the room, the floor plan changes, and theoretically, the database should be updated to maintain accuracy.

In some embodiments, when three devices collect CSI, there are three sets of features including Proxy (PM), Motion Statistic (MS), and Special Feature (SF). For device calibration and feature estimation, discarding regression points that get the user tracking stuck.

Figure 9:
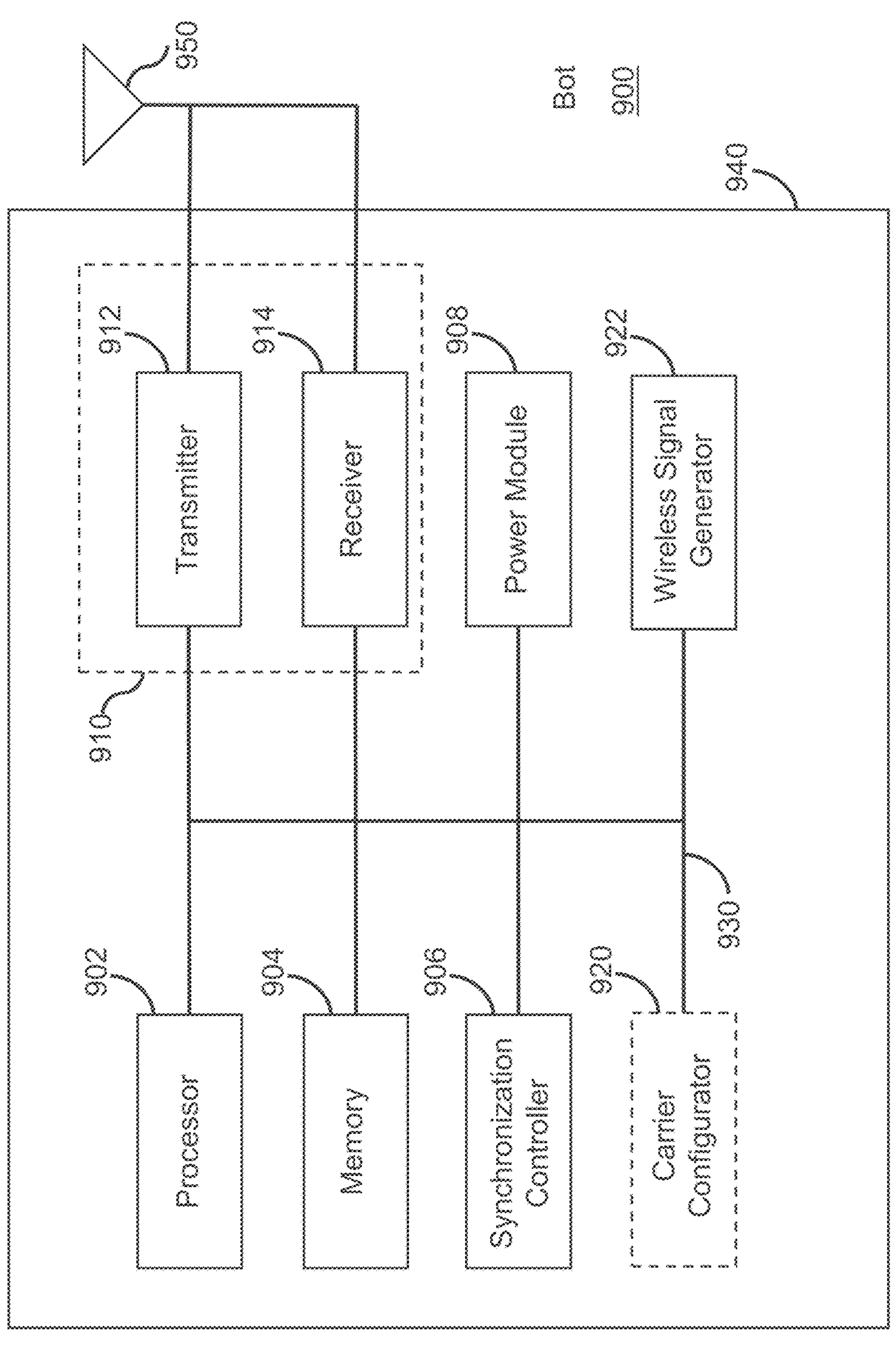
FIG. 9 illustrates an example block diagram of a first wireless device of a system for wireless tracking, according to some embodiments of the present disclosure.

FIG. 9 illustrates an example block diagram of a first wireless device, e.g. a Bot 900, of a wireless tracking system, according to one embodiment of the present teaching. The Bot 900 is an example of a device that can be configured to implement the various methods described herein. As shown in FIG. 9, the Bot 900 includes a housing 940 containing a processor 902, a memory 904, a transceiver 910 comprising a transmitter 912 and receiver 914, a synchronization controller 906, a power module 908, an optional carrier configurator 920 and a wireless signal generator 922.

In this embodiment, the processor 902 controls the general operation of the Bot 900 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 904, which can include both read-only memory (ROM) and random access memory (RAM), can provide instructions and data to the processor 902. A portion of the memory 904 can also include non-volatile random access memory (NVRAM). The processor 902 typically performs logical and arithmetic operations based on program instructions stored within the memory 904. The instructions (a.k.a., software) stored in the memory 904 can be executed by the processor 902 to perform the methods described herein. The processor 902 and the memory 904 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 910, which includes the transmitter 912 and receiver 914, allows the Bot 900 to transmit and receive data to and from a remote device (e.g., an Origin or another Bot). An antenna 950 is typically attached to the housing 940 and electrically coupled to the transceiver 910. In various embodiments, the Bot 900 includes (not shown) multiple transmitters, multiple receivers, and multiple transceivers. In one embodiment, the antenna 950 is replaced with a multi-antenna array 950 that can form a plurality of beams each of which points in a distinct direction. The transmitter 912 can be configured to wirelessly transmit signals having different types or functions, such signals being generated by the processor 902. Similarly, the receiver 914 is configured to receive wireless signals having different types or functions, and the processor 902 is configured to process signals of a plurality of different types.

The Bot 900 in this example may serve as a Bot 102 in FIG. 1 for performing one or more wireless sensing or tracking tasks. For example, the wireless signal generator 922 may generate and transmit, via the transmitter 912, a wireless signal through a wireless multipath channel impacted by a motion of an object in the venue. The wireless signal carries information of the channel. Because the channel was impacted by the motion, the channel information includes motion information that can represent the motion of the object. As such, the motion can be indicated and detected based on the wireless signal. The generation of the wireless signal at the wireless signal generator 922 may be based on a request for motion detection from another device, e.g. an Origin, or based on a system pre-configuration. That is, the Bot 900 may or may not know that the wireless signal transmitted will be used to detect motion.

The synchronization controller 906 in this example may be configured to control the operations of the Bot 900 to be synchronized or un-synchronized with another device, e.g. an Origin or another Bot. In one embodiment, the synchronization controller 906 may control the Bot 900 to be synchronized with an Origin that receives the wireless signal transmitted by the Bot 900. In another embodiment, the synchronization controller 906 may control the Bot 900 to transmit the wireless signal asynchronously with other Bots. In another embodiment, each of the Bot 900 and other Bots may transmit the wireless signals individually and asynchronously.

The carrier configurator 920 is an optional component in Bot 900 to configure transmission resources, e.g. time and carrier, for transmitting the wireless signal generated by the wireless signal generator 922. In one embodiment, each CI of the time series of CI has one or more components each corresponding to a carrier or sub-carrier of the transmission of the wireless signal. The detection of the motion may be based on motion detections on any one or any combination of the components.

The power module 908 can include a power source such as one or more batteries, and a power regulator, to provide regulated power to each of the above-described modules in FIG. 9. In some embodiments, if the Bot 900 is coupled to a dedicated external power source (e.g., a wall electrical outlet), the power module 908 can include a transformer and a power regulator.

The various modules discussed above are coupled together by a bus system 930. The bus system 930 can include a data bus and, for example, a power bus, a control signal bus, and/or a status signal bus in addition to the data bus. It is understood that the modules of the Bot 900 can be operatively coupled to one another using any suitable techniques and mediums.

Although a number of separate modules or components are illustrated in FIG. 9, persons of ordinary skill in the art will understand that one or more of the modules can be combined or commonly implemented. For example, the processor 902 can implement not only the functionality described above with respect to the processor 902, but also implement the functionality described above with respect to the wireless signal generator 922. Conversely, each of the modules illustrated in FIG. 9 can be implemented using a plurality of separate components or elements.

Figure 10:
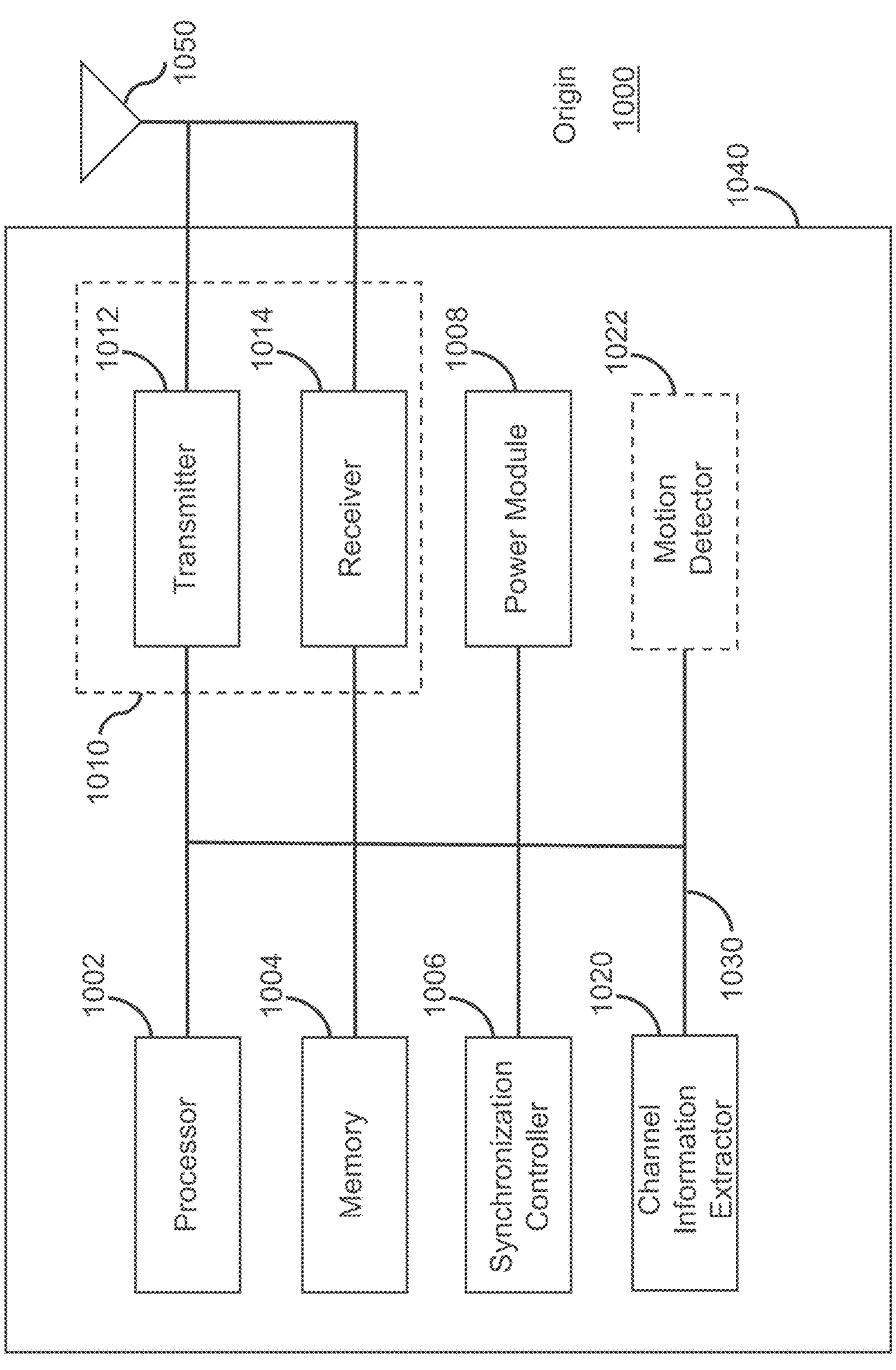
FIG. 10 illustrates an example block diagram of a second wireless device of a system for wireless tracking, according to some embodiments of the present disclosure.

FIG. 10 illustrates an example block diagram of a second wireless device, e.g. an Origin 1000, of a wireless tracking system, according to one embodiment of the present teaching. The Origin 1000 is an example of a device that can be configured to implement the various methods described herein. The Origin 1000 in this example may serve as an Origin 104 in FIG. 1 for performing one or more wireless sensing or tracking tasks. As shown in FIG. 10, the Origin 1000 includes a housing 1040 containing a processor 1002, a memory 1004, a transceiver 1010 comprising a transmitter 1012 and a receiver 1014, a power module 1008, a synchronization controller 1006, a channel information extractor 1020, and an optional motion detector 1022.

In this embodiment, the processor 1002, the memory 1004, the transceiver 1010 and the power module 1008 work similarly to the processor 902, the memory 904, the transceiver 910 and the power module 908 in the Bot 900. An antenna 1050 or a multi-antenna array 1050 is typically attached to the housing 1040 and electrically coupled to the transceiver 1010.

The Origin 1000 may be a second wireless device that has a different type from that of the first wireless device (e.g. the Bot 900). In particular, the channel information extractor 1020 in the Origin 1000 is configured for receiving the wireless signal through the wireless multipath channel impacted by the motion of the object in the venue, and obtaining a time series of channel information (CI) of the wireless multipath channel based on the wireless signal. The channel information extractor 1020 may send the extracted CI to the optional motion detector 1022 or to a motion detector outside the Origin 1000 for detecting object motion in the venue.

The motion detector 1022 is an optional component in the Origin 1000. In one embodiment, it is within the Origin 1000 as shown in FIG. 10. In another embodiment, it is outside the Origin 1000 and in another device, which may be a Bot, another Origin, a cloud server, a fog server, a local server, and an edge server. The optional motion detector 1022 may be configured for detecting the motion of the object in the venue based on motion information related to the motion of the object. The motion information associated with the first and second wireless devices is computed based on the time series of CI by the motion detector 1022 or another motion detector outside the Origin 1000.

The synchronization controller 1006 in this example may be configured to control the operations of the Origin 1000 to be synchronized or un-synchronized with another device, e.g. a Bot, another Origin, or an independent motion detector. In one embodiment, the synchronization controller 1006 may control the Origin 1000 to be synchronized with a Bot that transmits a wireless signal. In another embodiment, the synchronization controller 1006 may control the Origin 1000 to receive the wireless signal asynchronously with other Origins. In another embodiment, each of the Origin 1000 and other Origins may receive the wireless signals individually and asynchronously. In one embodiment, the optional motion detector 1022 or a motion detector outside the Origin 1000 is configured for asynchronously computing respective heterogeneous motion information related to the motion of the object based on the respective time series of CI.

The various modules discussed above are coupled together by a bus system 1030. The bus system 1030 can include a data bus and, for example, a power bus, a control signal bus, and/or a status signal bus in addition to the data bus. It is understood that the modules of the Origin 1000 can be operatively coupled to one another using any suitable techniques and mediums.

Although a number of separate modules or components are illustrated in FIG. 10, persons of ordinary skill in the art will understand that one or more of the modules can be combined or commonly implemented. For example, the processor 1002 can implement not only the functionality described above with respect to the processor 1002, but also implement the functionality described above with respect to the channel information extractor 1020. Conversely, each of the modules illustrated in FIG. 10 can be implemented using a plurality of separate components or elements.

In one embodiment, in addition to the Bot 900 and the Origin 1000, the system may also comprise: an assistance device, a third wireless device, e.g. another Bot, configured for transmitting an additional heterogeneous wireless signal through an additional wireless multipath channel impacted by the motion of the object in the venue, or a fourth wireless device, e.g. another Origin, that has a different type from that of the third wireless device. The fourth wireless device may be configured for: receiving the additional heterogeneous wireless signal through the additional wireless multipath channel impacted by the motion of the object in the venue, and obtaining a time series of additional channel information (CI) of the additional wireless multipath channel based on the additional heterogeneous wireless signal. The additional CI of the additional wireless multipath channel is associated with a different protocol or configuration from that associated with the CI of the wireless multipath channel. For example, the wireless multipath channel is associated with LTE, while the additional wireless multipath channel is associated with Wi-Fi. In this case, the optional motion detector 1022 or a motion detector outside the Origin 1000 is configured for detecting the motion of the object in the venue based on both the motion information associated with the first and second wireless devices and additional motion information associated with the third and fourth wireless devices computed by at least one of an additional motion detector and the fourth wireless device based on the time series of additional CI.

In some embodiments, the present teaching discloses systems and methods for wireless tracking.

Figure 11:
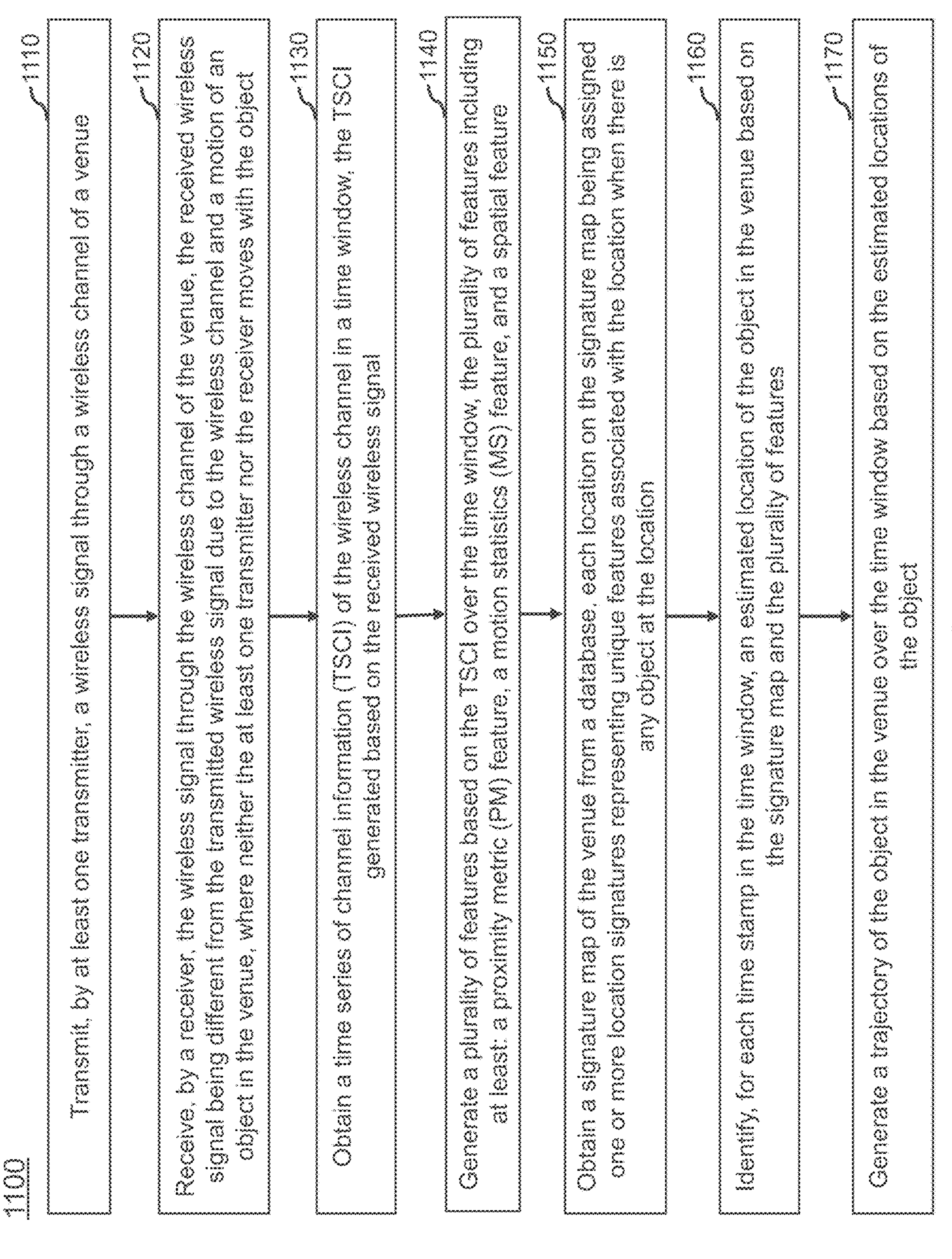
FIG. 11 illustrates a flow chart of an example method for wireless tracking, according to some embodiments of the present disclosure.

FIG. 11 illustrates a flow chart of an example method 1100 for wireless tracking, according to some embodiments of the present disclosure. In various embodiments, the method 1100 can be performed by any of the systems disclosed above. At operation 1110, a wireless signal is transmitted by at least one transmitter through a wireless channel of a venue. At operation 1120, the wireless signal is received, by a receiver, through the wireless channel of the venue. The received wireless signal differs from the transmitted wireless signal due to the wireless channel and a motion of an object in the venue. Neither the at least one transmitter nor the receiver moves with the object. At operation 1130, a time series of channel information (TSCI) of the wireless channel is obtained in a time window, The TSCI is generated based on the received wireless signal. At operation 1140, a plurality of features is generated based on the TSCI over the time window. The plurality of features includes at least: a proximity metric (PM) feature, a motion statistics (MS) feature, and a spatial feature. At operation 1150, a signature map of the venue is obtained from a database. Each location on the signature map is assigned one or more location signatures representing unique features associated with the location when there is any object at the location. At operation 1160, an estimated location of the object is identified in the venue, for each time stamp in the time window, based on the signature map and the plurality of features. At operation 1170, a trajectory of the object in the venue is generated over the time window based on the estimated locations of the object.

The following numbered clauses provide examples for wireless tracking.

Clause 1. A system for wireless tracking, comprising: at least one transmitter configured to transmit a wireless signal through a wireless channel of a venue; a receiver configured to receive the wireless signal through the wireless channel of the venue, wherein the received wireless signal differs from the transmitted wireless signal due to the wireless channel and a motion of an object in the venue, wherein neither the at least one transmitter nor the receiver moves with the object; and a processor configured to: obtain a time series of channel information (TSCI) of the wireless channel in a time window, wherein the TSCI is generated based on the received wireless signal, generate a plurality of features based on the TSCI over the time window, wherein the plurality of features includes at least: a proximity metric (PM) feature, a motion statistics (MS) feature, and a spatial feature, obtain a signature map of the venue from a database, wherein each location on the signature map is assigned one or more location signatures representing unique features associated with the location when there is any object at the location, identify, for each time stamp in the time window, an estimated location of the object in the venue based on the signature map and the plurality of features, and generate a trajectory of the object in the venue over the time window based on the estimated locations of the object.

Clause 2. The system of clause 1, wherein the processor is configured to generate the plurality of features based at least partially by: computing a space-frequency correlation of channel information (CI) amplitudes of the TSCI across subcarriers over the time window; and generating the PM feature based on the space-frequency correlation for each time stamp in the time window, wherein the PM feature indicates a distance between the object and the receiver.

Clause 3. The system of clause 2, wherein the processor is configured to generate the plurality of features based at least partially by: computing a temporal autocorrelation of CI amplitudes of the TSCI over the time window; and generating the MS feature based on the temporal autocorrelation for each time stamp in the time window, wherein the MS feature indicates a motion continuity and a motion intensity of the object.

Clause 4. The system of clause 3, wherein the processor is configured to generate the plurality of features based at least partially by: performing a principal component analysis (PCA) on all CI of the TSCI to generate principal components; generating principal component data from the principal components based on at least one of: a ranking of the principal components, a weighted combination of some of the principal components, or a function of one or more of the principal components; and generating the spatial feature based on the principal component data for each time stamp in the time window, wherein the spatial feature indicates location related characteristics of the object.

Clause 5. The system of clause 4, wherein the processor is further configured to: during an offline phase of the system: collect the plurality of features during a tracking test in the venue; generate the signature map of the venue based at least partially by: for each corresponding location on the signature map, aggregating the plurality of features to generate a set of location signatures, and labeling the set of location signatures with the corresponding location; and store the signature map of the venue into the database before the TSCI is obtained.

Clause 6. The system of clause 5, wherein the processor is configured to identify the estimated location of the object in the venue based at least partially by: assigning a first weight to the PM feature; assigning a second weight to the MS feature; assigning a third weight to the spatial feature; computing a weighted combination of the PM feature, the MS feature, and the spatial feature based on their respectively assigned weights; and performing a temporal distance maximum likelihood estimation over the time window based on the weighted combination and the signature map, to determine an initial location index in the signature map associated with the estimated location of the object in the venue for each time stamp in the time window.

In some embodiments, the first weight is greater than the second weight and the third weight.

Clause 7. The system of clause 6, wherein the processor is configured to generate the trajectory of the object in the venue based at least partially by: generating an updated location index for a current time stamp in the time window, by refining the initial location index using a particle filter; performing a calibration phase of passive tracking, periodically or upon the object being stuck at a location for longer than a predetermined time period, to generate a calibrated location index for the current time stamp; and generating the trajectory of the object in the venue based on the updated location index and/or the calibrated location index for each time stamp in the time window.

Clause 8. The system of clause 7, wherein generating the updated location index for the current time stamp comprises: inputting the initial location index for each time stamp before the current time stamp in the time window into a linear motion model to generate a refined location index for the current time stamp based on an assumption of a continuous moving path of the object in the venue; and generating the updated location index for the current time stamp based on: the refined location index, the weighted combination of the plurality of features, and one or more floor plan constraints associated with the venue.

Clause 9. The system of clause 8, wherein performing the calibration phase of passive tracking comprises: determining that the object stops at a same location for longer than the predetermined time period based on the updated location index over the time window; determining that the object is in close proximity to a device among the at least one transmitter and the receiver for the current time stamp, with a confidence level higher than a predetermined threshold; generating the calibrated location index for the current time stamp based on the close proximity and the confidence level; and replacing the updated location index with the calibrated location index for the current time stamp.

Clause 10. The system of clause 9, wherein: the at least one transmitter includes a plurality of transmitters distributed in the venue; and the trajectory is generated independent of a quantity and locations of the plurality of transmitters.

Clause 11. A method for wireless tracking, comprising: transmitting, by at least one transmitter, a wireless signal through a wireless channel of a venue; receiving, by a receiver, the wireless signal through the wireless channel of the venue, wherein the received wireless signal differs from the transmitted wireless signal due to the wireless channel and a motion of an object in the venue, wherein neither the at least one transmitter nor the receiver moves with the object; obtaining a time series of channel information (TSCI) of the wireless channel in a time window, wherein the TSCI is generated based on the received wireless signal; generating a plurality of features based on the TSCI over the time window, wherein the plurality of features includes at least: a proximity metric (PM) feature, a motion statistics (MS) feature, and a spatial feature; obtaining a signature map of the venue from a database, wherein each location on the signature map is assigned one or more location signatures representing unique features associated with the location when there is any object at the location; identifying, for each time stamp in the time window, an estimated location of the object in the venue based on the signature map and the plurality of features, and generating a trajectory of the object in the venue over the time window based on the estimated locations of the object.

Clause 12. The method of clause 11, wherein generating the plurality of features comprises: computing a space-frequency correlation of channel information (CI) amplitudes of the TSCI across subcarriers over the time window; and generating the PM feature based on the space-frequency correlation for each time stamp in the time window, wherein the PM feature indicates a distance between the object and the receiver.

Clause 13. The method of clause 12, wherein generating the plurality of features comprises: computing a temporal autocorrelation of CI amplitudes of the TSCI over the time window; and generating the MS feature based on the temporal autocorrelation for each time stamp in the time window, wherein the MS feature indicates a motion continuity and a motion intensity of the object.

Clause 14. The method of clause 13, wherein generating the plurality of features comprises: performing a principal component analysis (PCA) on all CI of the TSCI to generate principal components; generating principal component data from the principal components based on at least one of: a ranking of the principal components, a weighted combination of some of the principal components, or a function of one or more of the principal components; and generating the spatial feature based on the principal component data for each time stamp in the time window, wherein the spatial feature indicates location related characteristics of the object.

Clause 15. The method of clause 14, further comprising: during an offline phase: collecting the plurality of features during a tracking test in the venue; generating the signature map of the venue based at least partially by: for each corresponding location on the signature map, aggregating the plurality of features to generate a set of location signatures, and labeling the set of location signatures with the corresponding location; and storing the signature map of the venue into the database before the TSCI is obtained.

Clause 16. The method of clause 15, wherein identifying the estimated location of the object in the venue comprises: assigning a first weight to the PM feature; assigning a second weight to the MS feature; assigning a third weight to the spatial feature; computing a weighted combination of the PM feature, the MS feature, and the spatial feature based on their respectively assigned weights; and performing a temporal distance maximum likelihood estimation over the time window based on the weighted combination and the signature map, to determine an initial location index in the signature map associated with the estimated location of the object in the venue for each time stamp in the time window.

Clause 17. The method of clause 16, wherein generating the trajectory of the object in the venue comprises: generating an updated location index for a current time stamp in the time window, by refining the initial location index using a particle filter; performing a calibration phase of passive tracking, periodically or upon the object being stuck at a location for longer than a predetermined time period, to generate a calibrated location index for the current time stamp; and generating the trajectory of the object in the venue based on the updated location index and/or the calibrated location index for each time stamp in the time window.

Clause 18. The method of clause 17, wherein generating the updated location index for the current time stamp comprises: inputting the initial location index for each time stamp before the current time stamp in the time window into a linear motion model to generate a refined location index for the current time stamp based on an assumption of a continuous moving path of the object in the venue; and generating the updated location index for the current time stamp based on: the refined location index, the weighted combination of the plurality of features, and one or more floor plan constraints associated with the venue.

Clause 19. The method of clause 18, wherein performing the calibration phase of passive tracking comprises: determining that the object stops at a same location for longer than the predetermined time period based on the updated location index over the time window; determining that the object is in close proximity to a device among the at least one transmitter and the receiver for the current time stamp, with a confidence level higher than a predetermined threshold; generating the calibrated location index for the current time stamp based on the close proximity and the confidence level; and replacing the updated location index with the calibrated location index for the current time stamp.

Clause 20. A device for wireless tracking, comprising: a receiver configured to receive a wireless signal from at least one transmitter through a wireless channel of a venue, wherein the received wireless signal differs from the transmitted wireless signal due to the wireless channel and a motion of an object in the venue, wherein neither the at least one transmitter nor the receiver moves with the object; and a processor configured to: obtain a time series of channel information (TSCI) of the wireless channel in a time window, wherein the TSCI is generated based on the received wireless signal, generate a plurality of features based on the TSCI over the time window, wherein the plurality of features includes at least: a proximity metric (PM) feature, a motion statistics (MS) feature, and a spatial feature, obtain a signature map of the venue from a database, wherein each location on the signature map is assigned one or more location signatures representing unique features associated with the location when there is any object at the location, identify, for each time stamp in the time window, an estimated location of the object in the venue based on the signature map and the plurality of features, and generate a trajectory of the object in the venue over the time window based on the estimated locations of the object.

The features described above may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., C, Java), including compiled or interpreted languages, and it may be deployed in any form, including as a stand-alone program or as a module, component, subroutine, a browser-based web application, or other unit suitable for use in a computing environment.

Suitable processors for the execution of a program of instructions include, e.g., both general and special purpose microprocessors, digital signal processors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

While the present teaching contains many specific implementation details, these should not be construed as limitations on the scope of the present teaching or of what may be claimed, but rather as descriptions of features specific to particular embodiments of the present teaching. Certain features that are described in this specification in the context of separate embodiments may also be implemented in combination in a single embodiment. Conversely, various features that are described in the context of a single embodiment may also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Particular embodiments of the subject matter have been described. Any combination of the features and architectures described above is intended to be within the scope of the following claims. Other embodiments are also within the scope of the following claims. In some cases, the actions recited in the claims may be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A system for wireless tracking, comprising:

at least one transmitter configured to transmit a wireless signal through a wireless channel of a venue;

a receiver configured to receive the wireless signal through the wireless channel of the venue, wherein the received wireless signal differs from the transmitted wireless signal due to the wireless channel and a motion of an object in the venue, wherein neither the at least one transmitter nor the receiver moves with the object; and a processor configured to:

obtain a time series of channel information (TSCI) of the wireless channel in a time window, wherein the TSCI is generated based on the received wireless signal, generate a plurality of features based on the TSCI over the time window, wherein the plurality of features includes at least: a proximity metric (PM) feature, a motion statistics (MS) feature, and a spatial feature, obtain a signature map of the venue from a database, wherein each location on the signature map is assigned one or more location signatures representing unique features associated with the location when there is any object at the location, identify, for each time stamp in the time window, an estimated location of the object in the venue based on the signature map and the plurality of features, and generate a trajectory of the object in the venue over the time window based on the estimated locations of the object.

2. The system of claim 1, wherein the processor is configured to generate the plurality of features based at least partially by:

computing a space-frequency correlation of channel information (CI) amplitudes of the TSCI across subcarriers over the time window; and generating the PM feature based on the space-frequency correlation for each time stamp in the time window, wherein the PM feature indicates a distance between the object and the receiver.

3. The system of claim 2, wherein the processor is configured to generate the plurality of features based at least partially by:

computing a temporal autocorrelation of CI amplitudes of the TSCI over the time window; and generating the MS feature based on the temporal autocorrelation for each time stamp in the time window, wherein the MS feature indicates a motion continuity and a motion intensity of the object.

4. The system of claim 3, wherein the processor is configured to generate the plurality of features based at least partially by:

performing a principal component analysis (PCA) on all CI of the TSCI to generate principal components;

generating principal component data from the principal components based on at least one of: a ranking of the principal components, a weighted combination of some of the principal components, or a function of one or more of the principal components; and generating the spatial feature based on the principal component data for each time stamp in the time window, wherein the spatial feature indicates location-related characteristics of the object.

5. The system of claim 4, wherein the processor is further configured to:

during an offline phase of the system:

collect the plurality of features during a tracking test in the venue;

generate the signature map of the venue based at least partially by: for each corresponding location on the signature map, aggregating the plurality of features to generate a set of location signatures, and labeling the set of location signatures with the corresponding location; and store the signature map of the venue into the database before the TSCI is obtained.

6. The system of claim 5, wherein the processor is configured to identify the estimated location of the object in the venue based at least partially by:

assigning a first weight to the PM feature;

assigning a second weight to the MS feature;

assigning a third weight to the spatial feature;

computing a weighted combination of the PM feature, the MS feature, and the spatial feature based on their respective assigned weights; and performing a temporal distance maximum likelihood estimation over the time window based on the weighted combination and the signature map, to determine an initial location index in the signature map associated with the estimated location of the object in the venue for each time stamp in the time window.

7. The system of claim 6, wherein the processor is configured to generate the trajectory of the object in the venue based at least partially by:

generating an updated location index for a current time stamp in the time window, by refining the initial location index using a particle filter;

performing a calibration phase of passive tracking, periodically or upon the object being stuck at a location for longer than a predetermined time period, to generate a calibrated location index for the current time stamp; and generating the trajectory of the object in the venue based on the updated location index and/or the calibrated location index for each time stamp in the time window.

8. The system of claim 7, wherein generating the updated location index for the current time stamp comprises:

inputting the initial location index for each time stamp before the current time stamp in the time window into a linear motion model to generate a refined location index for the current time stamp based on an assumption of a continuous moving path of the object in the venue; and generating the updated location index for the current time stamp based on: the refined location index, the weighted combination, and one or more floor plan constraints associated with the venue.

9. The system of claim 8, wherein performing the calibration phase of passive tracking comprises:

determining that the object stops at the same location for longer than the predetermined time period based on the updated location index over the time window;

determining that the object is in close proximity to a device among the at least one transmitter and the receiver for the current time stamp, with a confidence level higher than a predetermined threshold;

generating the calibrated location index for the current time stamp based on the close proximity and the confidence level; and replacing the updated location index with the calibrated location index for the current time stamp.

10. The system of claim 9, wherein:

the at least one transmitter includes a plurality of transmitters distributed in the venue; and the trajectory is generated independent of a quantity and locations of the plurality of transmitters.

11. A method for wireless tracking, comprising:

transmitting, by at least one transmitter, a wireless signal through a wireless channel of a venue;

receiving, by a receiver, the wireless signal through the wireless channel of the venue, wherein the received wireless signal differs from the transmitted wireless signal due to the wireless channel and a motion of an object in the venue, wherein neither the at least one transmitter nor the receiver moves with the object;

obtaining a time series of channel information (TSCI) of the wireless channel in a time window, wherein the TSCI is generated based on the received wireless signal;

generating a plurality of features based on the TSCI over the time window, wherein the plurality of features includes at least: a proximity metric (PM) feature, a motion statistics (MS) feature, and a spatial feature;

obtaining a signature map of the venue from a database, wherein each location on the signature map is assigned one or more location signatures representing unique features associated with the location when there is any object at the location;

identifying, for each time stamp in the time window, an estimated location of the object in the venue based on the signature map and the plurality of features; and generating a trajectory of the object in the venue over the time window based on the estimated locations of the object.

12. The method of claim 11, wherein generating the plurality of features comprises:

computing a space-frequency correlation of channel information (CI) amplitudes of the TSCI across subcarriers over the time window; and generating the PM feature based on the space-frequency correlation for each time stamp in the time window, wherein the PM feature indicates a distance between the object and the receiver.

13. The method of claim 12, wherein generating the plurality of features comprises:

computing a temporal autocorrelation of CI amplitudes of the TSCI over the time window; and generating the MS feature based on the temporal autocorrelation for each time stamp in the time window, wherein the MS feature indicates a motion continuity and a motion intensity of the object.

14. The method of claim 13, wherein generating the plurality of features comprises:

performing a principal component analysis (PCA) on all CI of the TSCI to generate principal components;

generating principal component data from the principal components based on at least one of: a ranking of the principal components, a weighted combination of some of the principal components, or a function of one or more of the principal components; and generating the spatial feature based on the principal component data for each time stamp in the time window, wherein the spatial feature indicates location-related characteristics of the object.

15. The method of claim 14, further comprising:

during an offline phase:

collecting the plurality of features during a tracking test in the venue;

generating the signature map of the venue based at least partially by: for each corresponding location on the signature map, aggregating the plurality of features to generate a set of location signatures, and labeling the set of location signatures with the corresponding location; and storing the signature map of the venue into the database before the TSCI is obtained.

16. The method of claim 15, wherein identifying the estimated location of the object in the venue comprises:

assigning a first weight to the PM feature;

assigning a second weight to the MS feature;

assigning a third weight to the spatial feature;

computing a weighted combination of the PM feature, the MS feature, and the spatial feature based on their respective assigned weights; and performing a temporal distance maximum likelihood estimation over the time window based on the weighted combination and the signature map, to determine an initial location index in the signature map associated with the estimated location of the object in the venue for each time stamp in the time window.

17. The method of claim 16, wherein generating the trajectory of the object in the venue comprises:

generating an updated location index for a current time stamp in the time window, by refining the initial location index using a particle filter;

performing a calibration phase of passive tracking, periodically or upon the object being stuck at a location for longer than a predetermined time period, to generate a calibrated location index for the current time stamp; and generating the trajectory of the object in the venue based on the updated location index and/or the calibrated location index for each time stamp in the time window.

18. The method of claim 17, wherein generating the updated location index for the current time stamp comprises:

inputting the initial location index for each time stamp before the current time stamp in the time window into a linear motion model to generate a refined location index for the current time stamp based on an assumption of a continuous moving path of the object in the venue; and generating the updated location index for the current time stamp based on: the refined location index, the weighted combination, and one or more floor plan constraints associated with the venue.

19. The method of claim 18, wherein performing the calibration phase of passive tracking comprises:

determining that the object stops at the same location for longer than the predetermined time period based on the updated location index over the time window;

determining that the object is in close proximity to a device among the at least one transmitter and the receiver for the current time stamp, with a confidence level higher than a predetermined threshold;

generating the calibrated location index for the current time stamp based on the close proximity and the confidence level; and replacing the updated location index with the calibrated location index for the current time stamp.

20. A device for wireless tracking, comprising:

a receiver configured to receive a wireless signal from at least one transmitter through a wireless channel of a venue, wherein the received wireless signal differs from the transmitted wireless signal due to the wireless channel and a motion of an object in the venue, wherein neither the at least one transmitter nor the receiver moves with the object; and a processor configured to:

obtain a time series of channel information (TSCI) of the wireless channel in a time window, wherein the TSCI is generated based on the received wireless signal, generate a plurality of features based on the TSCI over the time window, wherein the plurality of features includes at least: a proximity metric (PM) feature, a motion statistics (MS) feature, and a spatial feature, obtain a signature map of the venue from a database, wherein each location on the signature map is assigned one or more location signatures representing unique features associated with the location when there is any object at the location, identify, for each time stamp in the time window, an estimated location of the object in the venue based on the signature map and the plurality of features, and generate a trajectory of the object in the venue over the time window based on the estimated locations of the object.

* * * * *